United States Patent [19]
Rao

[11] Patent Number: 6,147,841
[45] Date of Patent: Nov. 14, 2000

[54] DATA STORAGE SYSTEM HAVING A POSITIVE ACTUATOR LATCHING ASSEMBLY

[75] Inventor: Vinod K. Rao, Fremont, Calif.

[73] Assignee: Seagate Technology, Inc., Scotts Valley, Calif.

[21] Appl. No.: 09/167,773

[22] Filed: Oct. 7, 1998

Related U.S. Application Data

[60] Provisional application No. 60/065,388, Nov. 12, 1997.

[51] Int. Cl.$^7$ .............................. G11B 5/54; G11B 21/22
[52] U.S. Cl. ...................... 360/256.2; 360/256.3
[58] Field of Search .................................. 360/104, 105, 360/256.2, 256.3

[56] References Cited

U.S. PATENT DOCUMENTS

| | | | |
|---|---|---|---|
| 4,805,044 | 2/1989 | Otsuki | 360/105 |
| 4,881,139 | 11/1989 | Hazebrouk | 360/105 |
| 5,303,101 | 4/1994 | Hatch et al. | 360/105 |
| 5,528,437 | 6/1996 | Mastache | 360/105 |
| 5,666,244 | 9/1997 | Ogawa | 360/106 |
| 5,717,544 | 2/1998 | Michael | 360/105 |
| 5,717,548 | 2/1998 | Koester et al. | 360/104 |
| 5,796,557 | 8/1998 | Bagnell et al. | 360/105 |

OTHER PUBLICATIONS

Brew, T. P. and Dickie, H. G., IBM Technical Disclosure Bulletin, vol. 25, No. 2, Jul. 1982, pp. 835–836.

*Primary Examiner*—David L. Ometz
*Assistant Examiner*—Franklin D. Altman
*Attorney, Agent, or Firm*—Edward P. Heller, III; Raghunath S. Minisandram

[57] ABSTRACT

A multiple disk drive storage system includes a latch assembly for positively latching a head positioning actuator arm when the head is positioned on a load/unload mechanism at the outer perimeter of the disks. Latching and unlatching cycles of the latch assembly are effected by interaction of the actuator arm motion and a latch arm retention magnet structure. In the latch position, the actuator arm is mechanically captured by a hook shaped latch head at one end of the movable latch arm, so that, even in a power off condition the actuator arm is positively latched by the combination of the actuator arm motion limitations, the latch head shape, the latch arm motion limitations and a bias spring urging the hooked latch head into a permanent, static latch with the actuator arm. The opposite end of the latch arm is provided with a magnetic mass which is attracted and held by the retention magnet. This magnet when the activated when the actuator arm is driven from a latching position toward a pre-reset position preparatory to releasing or unlatching the actuator arm. After the opposite end of the latch arm is captured by the magnet, the actuator arm motion is released. The reset portion is disposed such that when struck by the actuator arm, the latch arm opposite end is released from the retention magnet, allowing the bias spring to return the latch arm and head to a rest position, ready to capture the actuator arm upon initiation of a subsequent latch cycle. The latch is now freed to rotate over the disk surfaces in its normal read/write function mode.

1 Claim, 14 Drawing Sheets

DATA STORAGE SYSTEM HAVING A POSITIVE ACTUATOR LATCHING ASSEMBLY

REFERENCE TO RELATED APPLICATION

The present application is based on a provisional application Ser. No. 60/065,388 filed on Nov. 12, 1997.

REFERENCES CITED

U.S. Patent Documents

| | | | | |
|---|---|---|---|---|
| 5,034,837 | Jul. 23, 1991 | Schmitz | 360/105 | (Schmitz '837) |
| 5,550,695 | Aug. 27, 1996 | Matsumoto | 360/105 | (Matsumoto '695) |
| 5,231,549 | Jul. 27, 1993 | Morehouse | 360/75 | (Morehouse '549) |
| 4,933,785 | Jun. 12, 1990 | Morehouse | 360/78.04 | (Morehouse '785) |
| 4,535,374 | Aug. 13, 1985 | Anderson | 360/103 | (Anderson '374) |
| 3,786,457 | Jan. 15, 1974 | Kahn | 340/174.1 | (Kahn '457) |
| 5,235,481 | Aug. 10, 1993 | Kamo | 360/97.01 | (Kamo '481) |
| 5,341,260 | Aug. 23, 1994 | Jabbari | 360/105 | (Jabbari '260) |
| 5,239,431 | Aug. 24, 1993 | Day | 360/98.08 | (Day '431) |

FIELD OF THE INVENTION

The present invention relates to latching devices in general and more particularly to latching devices used in disk drive systems.

BACKGROUND ART

The use of disks for data storage is universal in the computer industry. Data can be stored on both sides of a disk in concentric recording tracks. To transfer data to and from a spinning disk during high performance read/write operations, at least one transducer is typically situated within micro inches of a surface of the disk. To accommodate such positioning, the transducer is affixed to a specially designed platform connected to an actuator. The platform is aerodynamically designed to fly adjacent to the recording media surface on a thin cushion of ambient air or gas that is created by the spinning disk. The air cushion serves to define the clearance between the transducer (hereinafter referred to as a head) and the spinning disk.

Increased head stability minimizes the likelihood of destructive contact between the head and disk, allowing the head to fly closer to the disk surface. As head/disk clearance is decreased, the density of data stored on the disk can be increased.

The head is typically connected to the actuator by some type of flexible linkage or gimbal (flexure) which allows the head to move in roll, pitch and yaw directions relative to the disk to maintain a relatively parallel relationship to the disk surface.

The flexure is typically connected to the actuator by a generally flat, longitudinal arm portion which is rotated or stroked by the actuator parallel to the surface of the disk thereby positioning the head to a target data transfer (read/write) location under control of servomotor and electronic means. The flexure and arm are configured to provide a spring force to maintain the head a proper distance from the disk under normal spinning conditions.

Designers of disk storage systems have historically been concerned with head to disk contact, either that due to start/stop operation or that caused by physical shock, vibration or acceleration. During normal operation, the thin fluid film between the spinning disk and the flying head provides a margin of safety. However, during initial startup, shut down or power loss, when the disk is not spinning at high speed, the fluid cushion disappears and the spring force of the flexure and arm urges the head to contact the disk directly. This may cause soft or hard data loss, particulate generation and catastrophic damage.

Attempted solutions to the aforementioned limitations include: protective disk coatings, head parking systems that maintain the head in contact with the disk in the power off condition at some dedicated disk area near the hub or perimeter, and/or head unloading systems to physically prevent or reduce the possibility of head-disk contact during non-operation. Disk storage systems without head unloading/loading mechanisms also have to deal with the additional start up torque required to overcome stiction between highly polished read/write heads and the exceedingly smooth disks of modern disk storage systems.

Head loading/unloading systems typically take the form of dynamic loading systems in which disks are brought up to speed or slowed down with the heads in some relatively remote position horizontally, vertically or both, until an air cushion develops. The heads are subsequently guided or positioned in normal vertical relationship to the surface of the disk.

Another area of concern, for disk storage system design, is the aspect of securing the heads after they have been separated from the disks. The following discussion reviews representative proposed mechanisms for loading/unloading and securing heads with discussion of individual benefits and disadvantages.

Day, in patent '431, shows a circumferential flange positioned between oppositely facing magnetic heads to minimize head slap caused by forces parallel to the disk spindle when the heads are in a parked position near the hub. The heads are not positively restrained but are still free to contact the surface of the disks, and the thickness of the flange requires additional spacing be allocated between the disks, thereby decreasing the possible storage density of multi-disk data storage systems.

Jabbari, in patent '260, discloses a staggered ramp assembly, which lowers the torque required for unloading the heads from the disks by separating the ramps for multiple heads into two groups. The inclined sections of the first group of ramps are contacted by a first group of heads, thereby lowering the torque required for lifting the first group of heads by about 2 of that if all heads were lifted at once. After the first group of heads are lifted from the respective disks and the first heads are riding on first ramp flat sections parallel to the disk surfaces, the torque decreases to a lower constant value, resulting from the spring force of the load beams and the friction of the first ramp flat section.

With further outward rotation of the heads, the second group of heads contacts the inclined sections of the outward-staggered ramps and is similarly lifted from the adjacent disks. Jabbari shows a graph comparing the lower torque requirement of the staggered ramps and discusses the decreased power requirements produced by lower torque. However, the lower torque is accompanied by an increased displacement, which is not discussed. Since mechanical work is the product of force times distance, the total energy required to lift both sets of heads then will be about the same as before. The staggered ramps also require an increased radial spacing bed allocated to accommodate the outward staggered ramps, therefore more disk surface must be dedicated to lifting the heads from the disks, thereby wasting possible data storage surface, and decreasing potential storage density.

Patent '481, by Kamo mentions a removable disk cartridge assembly having a ramp loading mechanism for holding the head or heads, with the ramp positioned outside the periphery of the disk when disengaged. Kamo provides no drawings, description or detail on the method or structure of the ramp loading mechanism.

Schmitz, in patent '837 describes a head assembly 136, a fixed ramp loading mechanism 134, and a magnetic actuator latching system 122–124 used with a dual disk and four-head magnetic drive 100. A pin 114 projecting from a rearward extending end of the actuator 116 magnetically latches with either an inner 122 or an outer 123 recessed circumferential latching surface provided on a magnet plate 123. Latching is provided by means of a lowered permanence path including the pin 114, the plate 124 and the associated voice coil motor magnets 118, 119 and either of surfaces 122 or 123, when the actuator is at one or the other extreme angular position. The pin 114 and associated latching surfaces provide a means of holding the actuator 116 magnetically fixed when the drive 100 is deactivated or powered down. The pin 114 and/or plate 124 may be permanent magnets or have residual magnetism such that attractive magnetic forces will hold the pin 114 against either latching surface 122 or 123 without actively driving current through magnetic holding coils so that the actuator arm is prevented from wandering and exposing the disks and heads to possible damage due to physical shocks.

Although not discussed by Schmitz, it is known that a force is required to move the actuator arm from a latched position when the drive is to be activated. Typically, the force to move the arm from the latched position will come from the actuator coil, in this case coil 120. Therefore, the coil 120 must be able to exert enough force to overcome the attractive force holding the pin 114 against surfaces 112, 123. Since the magnitude of the attractive force is directly related to the amount of resistance to physical shock which the drive can sustain, the coil removing force required will similarly scale upwards as this resistance is increased. Increased resistance to shock damage therefore translates into increased power, size and weight demands on the design of such a magnetically latched drive, including the drive electronics. This becomes increasingly problematic for small, portable drives where the coil size and strength and battery capacity is limited, or for drives with many disks having many actuators.

Another consideration for magnetically captured arm/head configurations is controlling the motion of the arm/head once the pin 114 pulls free from the latched position. The torsion applied to the pin and the arm assembly may store elastic energy in the assembly. The large force required to free the arm from its magnetically latched position may cause the arm to jerk free and swing rapidly toward the active disk area. Such a jerk can initiate oscillations in the arm and head due to the resonance of the long cantilever arm, the flexure, and the head suspended therefrom. Such oscillations could result in an edge or corner of the head contacting and damaging the disk surface before the arm can be brought under control.

Another problematic aspect of magnetically latched configurations is the influence of the magnetic latch surfaces on the positioning characteristics of the arm assembly. When the arm approaches an extreme position close to the latch surface, although not close enough to be latched, the arm may still be attracted by the magnetic field and therefore non-uniformly influence the torque-position characteristic of the arm. Additional software or hardware must be added to the data storage system in such cases to compensate for the non-uniform characteristics.

Schmitz also describes a physically fixed unloading ramp structure for receiving the heads in a lifted position when the arm is latched. The ramp structure includes fixed ramps for each head, each fixed ramp overlapping a portion of the outer perimeter of the respective disk. Since the ramps overlay a portion of the disk perimeter, additional space between adjacent disks must be provided. This is a disadvantage for achieving increase data storage density for multi-disk storage systems.

Matsumoto describes another ramp loading and latching mechanism in patent '695. An actuator assembly 25 rotatably mounted on shaft 10 includes head arms 26 corresponding in number to magnetic disks 24. A voice coil 27 on the opposite side of head arm 26 from the shaft 10 rotatably drives the assembly 25. Each of the head arms 26 have one or more spring arms 28 extending therefrom, to each of which are mounted at adjacent distal ends, a corresponding magnetic head 29 for reading and writing to data tracks of each side of a respective disk 24 as the heads 29 are positioned to a particular track. At the center of one side of each head 29 there is formed a protrusion 30 for latching with a corresponding recess 46 provided on one end of a corresponding unloading ramp member 12. Each ramp member 12 is circumferentially mounted on a respective cylindrical boss 41 carried on a bearing 44. The bearing 44 is rotatably mounted on a pin 40. The pin 40 is fixed to the same base 21 supporting the disks 24 and arms 26. The ramp member 12 is comprised of first and second ramp arms 42 and 43 projecting from the boss 41 in planes parallel to the respective disk.

The arms 42 and 43 are disposed in a V-shape so that a rounded distal end of arm 43 makes abutting line contact with an outer surface of a corresponding head arm 26 when the head 29 and arm 26 is swung sufficiently outward from the center of the disks 24. The V-shape of the arms 42, 43 is arranged so that a slant ramp face 45 on the distal end of arm 42 will come into sliding contact with a respective under side of the associated spring arm 28 thereby lifting the head 29 away from the disk 24 read/write surface as the head arm 26 urges the second arm 43 away from the disks and urges first arm 42 toward the disks about the rotatable axis provided by pin 12. Such rotation continues until the protrusion 30 is engaged with the recess 46.

In this position, the heads 29 are safely separated from the disks 24 read/write surfaces. Suitable springs and stops position the ramp face 45 and the distal end of arm 43 so that the latching and unloading functions do not interfere with the normal operation of the read and write functions of the disk drive.

Provision is made for actuating such separation in case of power loss by utilizing the back EMF of the spindle motor, in the conventional manner. Unloading may also be actuated deliberately by suitable electronic command when preparing for moving or shipping the disk drive.

Again, no discussion is presented of the force necessary to disengage the protrusion 30 from recess 46 in order to move the head 29 from the latched position. No accounting is made of design limitations imposed by the power demands of the coil 29 (increased amp-turns product, increased coil resistance and consequent voltage requirements, etc.) and magnet assembly or the increased energy drain from the supply. In addition, over time the friction of the protrusion 30 sliding in and out of recess 46 may generate problematic particulate matter, which could cause catastrophic data loss.

The structure of '695 provides a semi-positive stop for the latching of the head 29 by the cooperation of spring arm 28, protrusion 30, recess 46, and arms 42, 43. However, the shock resistance of the protrusion 30, recess 46, and spring arm 28 will depend on the relative dimensions and spring force provided. In order to meet severe shock requirements, dimensions and/or spring forces will scale with shock requirements. An increased force is thus required to release the protrusion 30 from engagement with recess 46 under spring force from arm 28. High shock resistance will necessitate increasingly powerful actuator coils, magnets and/or larger and heavier components and greater current drain from limited battery supplies. Even so, under sufficient shock the head 29 can still be jarred loose and potentially destroy data on the disk 24.

Additionally, since a portion of the arms 42 and 43 pass over the perimeter of the disks 24 in order to contact the actuator arm 26, additional spacing between adjacent disks must be provided to accommodate the thickness of the arms 42 and 43. Again, this presents a disadvantage for achieving high data storage density.

Morehouse et al., in patent '549 describes a ramp loading and latching system for a multiple disk storage system using fixed ramp-type cam assemblies 42. Morehouse includes an inclined inner ramp face 250 and outer ramp face 254 engaging in portions of associated load beam 224 for loading and unloading heads 230 connected thereto from read/write flying relationship with disks 222. The load beams 224 are part of the actuator assembly 220, which includes the conventional associated actuator coil, pivot and control. The ramp faces 250, 254 are located within the outer perimeter of the disks 222 thereby taking up some of the potential data storage space of the disk surface. The actuator coil rotates the load beams 224 outward so that the contacting load portions of the beam 224 rides up the first inclined surface 250 separating the head assembly 230 from the disk 222. Further outward rotation of the load beam 224 causes the load beam to ride down the oppositely sloped outward ramp 254 to be captured on a flat surface 244 of the ramp assembly 42.

The system of '549 has similar characteristics of shock resistance, power supply and particulate considerations as Matsumoto '695 described above. Also, '549 has the disadvantageous loss of potential data storage area at the perimeter of the disks. In addition, higher loading/unloading friction forces are required for a given head to disk positioning spring torque, since the loading portions of the load beam 224 are located nearer the midpoint of the beam than the head end. This translates into increased power, size and weight for the drive components and decreased battery life for portable drives.

Patent '374 by Anderson et al., describes a radially directed head loading apparatus 10 having an electrically controlled linear actuator 23, carrying a support arm 26 for positioning a Whitney-type suspension arm 28 and Whitney-size head 36. The suspension 28 creates a resilient, spring-like attribute to support the head 36 in read/write relationship to a disk 18 in normal operation.

A triangular, two sided, longitudinal ramp portion 44 is disposed along one face of the arm 28, and rides on a stationary circular cam 50. The ramp portion 44 is comprised of a first section 46 and a second section 48. The two sections are inclined and positioned with respect to the arm 28 and cam 50 so that the head 36 will gently approach and retreat vertically from the disk 18 as the arm 28 is actuated toward and away from the center of the disk 18 between normal operation and non-operation.

No discussion is provided on how the actuator 23 is secured during power off or inactive conditions to prevent the arm from projecting the head into a possible head-disk contact situation. For multiple head/disk systems, the size, cost and weight of multiple linear actuators with the associated power and thermal dissipation requirements may be problematic.

Patent '457 by Kahn also discloses a radially directed linear actuator arm 14 with a ramp 30 contacting a fixed cam 32 for vertically displacing a head 28 from a disk 26 during unloading. The method of securing the arm 14 in the unloaded position is not discussed.

Disk drive latching systems are known which add solenoids with actuating pins for capturing the head-positioning arm with the head or heads in a positive displaced position relative to the disk surface. Such solenoid capture systems contribute not only additional cost, weight, size, thermal dissipation, and decreased reliability added by another solenoid, but further decrease the potential battery life for portable systems.

The prior art systems that do incorporate latching mechanisms for restraining the head during power off or inactive state only partially address design issues related to the restraint problem. Except for stepper motor driven or positive solenoid latched systems, the robustness of restraint (i.e., shock resistance) scales with one or more of the critical design parameters. These cause data storage systems to be larger, weigh more, have lower reliability, and/or consume more power (lower battery life) than preferred.

What is needed, therefore, is a latching system which addresses the limitations of the prior art in an effective manner.

SUMMARY OF THE INVENTION

It is an object of the present invention to provide a head restraint system that minimizes interdisk spacing in multiple disk data storage systems.

It is also an object of this invention to provide a head restraint system that minimizes wasted data transfer tracks at the perimeter of the disks.

Another object of the invention is to eliminate transducer head landing or loading zones on the disk surfaces.

An additional object of preferred embodiments of this invention is to provide a power off/inactive state head restraint system having vibration and physical shock restraint margins which scale essentially independent of one or more of the latch size, latch release/capture power, energy, weight and reliability design parameters.

It is still another object of the present invention to positively restrain the heads in a latch position radially distal from the disk surfaces to reduce the possibility of head-disk contact in a power off condition.

Another objective of the present invention is to provide a head restraint system amenable to inclusion in removable disk drive cartridges.

An advantage of the present invention is the design freedom provided for selection of recording media, since head/disk contact does not occur at any point in normal operation, or normal or power off shutdown. Special anti-friction, anti-wear or lubrication coatings are not necessarily required. Problems of head/disk stiction with the attendant required increase in actuator motor power are also reduced.

Still another object of a preferred embodiment of the invention is to utilize a simple bi-directional motion of the transducer carrying actuator arm in combination with another simple bi-directional motion of the positive latch head to latch and unlatch the arm to and from a positive latch position.

Yet another object of a preferred embodiment of the invention is to provide a positive latch for a disk drive actuator arm, which enables the use of a smaller, lighter, lower power, longer lived solenoid for momentarily holding a hook shaped latch head in an unlatching position relative to transducer head carrying actuator arms while said arms are driven free of latching restraint by said head.

BRIEF DESCRIPTION OF THE DRAWINGS

For a further understanding of the objects and advantages of the present invention, reference should be had to the following detailed description, taken in conjunction with the accompanying drawings, in which like parts are given like reference numerals and wherein;

FIG. 5b shows a magnified detail of a portion of latch pin 147 and latch tooth 342 of FIG. 5a.

DETAILED DESCRIPTION OF A PREFERRED EMBODIMENT OF THE INVENTION

Figure 1:
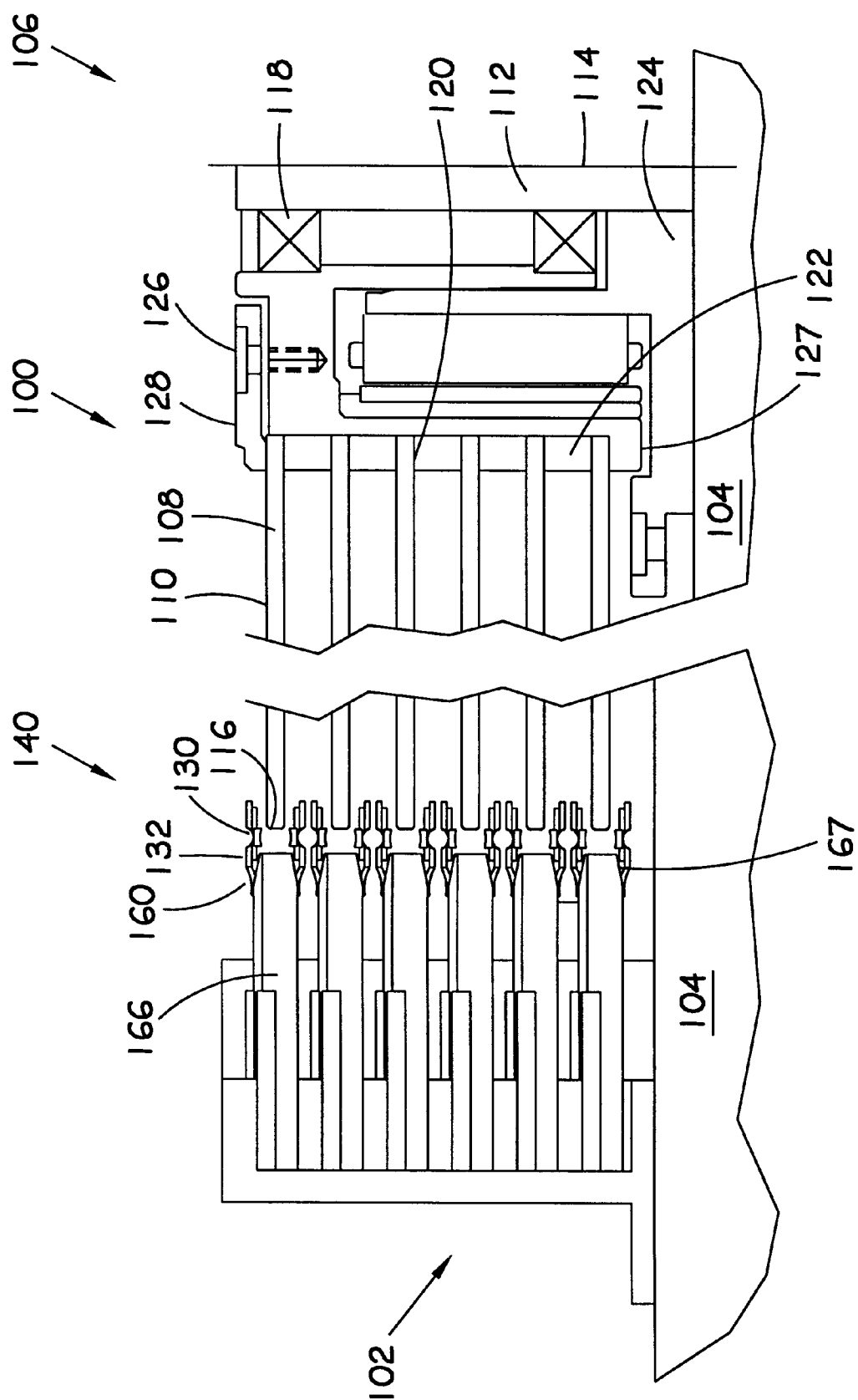
FIG. 1 shows an elevation view of a representative multi-disk data storage system.
Figure 2:
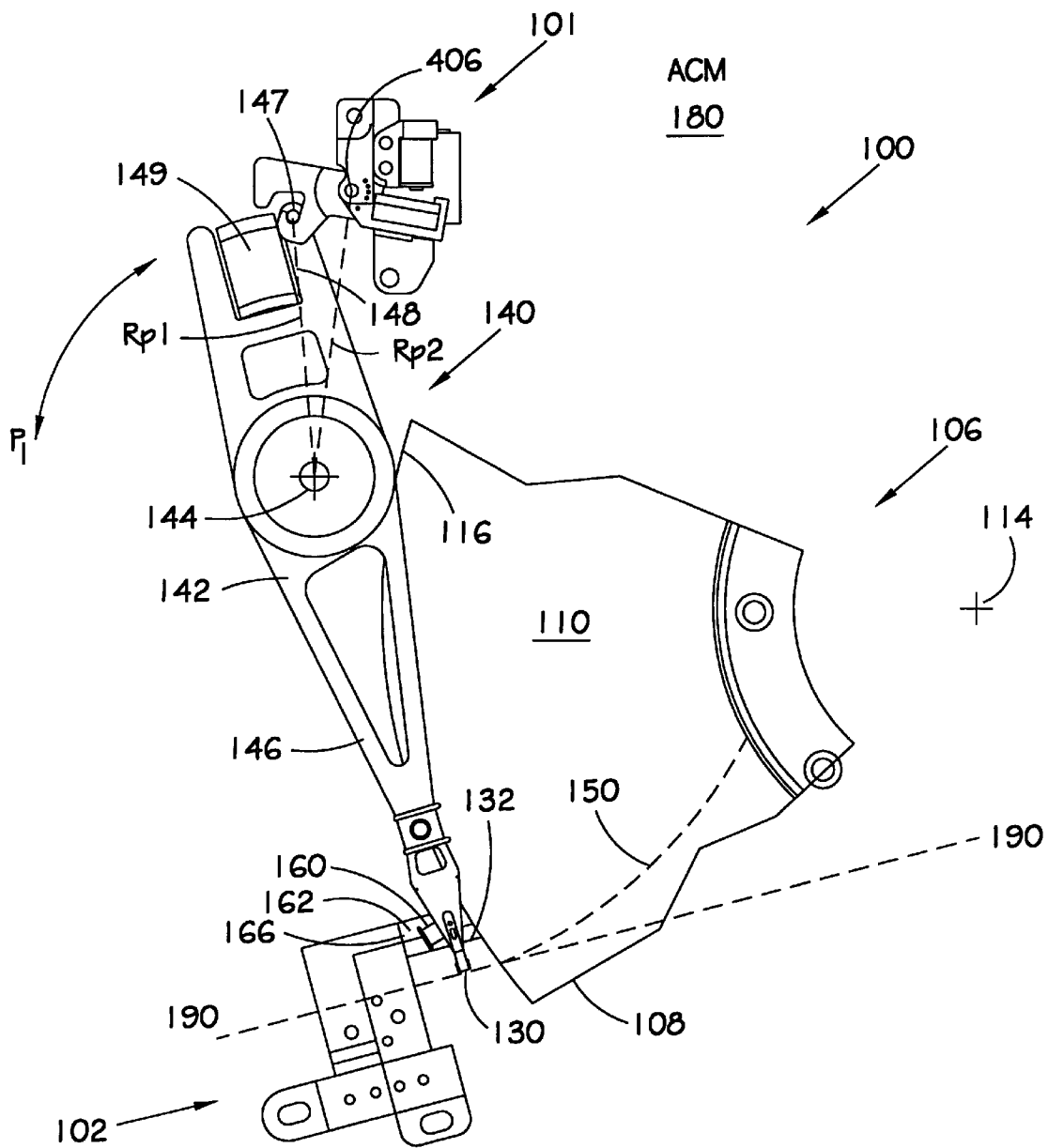
FIG. 2 illustrates an embodiment of the multi-disk version of the data storage system shown in FIG. 1 with a latch assembly of the present invention added.

With reference to FIG. 1 there is shown a partial cutaway elevation view of a representative multi-disk data storage system 100, having a ramp loading/unloading assembly 102. FIG. 2 depicts a view of the storage system 100 and ramp assembly 102 in cooperative relationship with an actuator arm assembly 140. A positive latching actuator assembly 101 in accordance with the present invention is shown in FIGS. 1–12.

Referring now to FIGS. 1 and 2, the multi-disk data storage system 100 includes; a base 104, a multi-disk rotor assembly 106 (showing only a sector thereof, the latch assembly 101, and the head ramp assembly 102 mounted thereon in adjacent relationship.

The major structural components of the exemplary disk storage and retrieval system 100 incorporating the positive latching assembly 101 of the present invention will first be described in some detail. A more detailed set of illustrations, depicting phases of a latching/unlatching cycle, are then presented showing the cooperation of the particular parts of the latch assembly 101 with related elements of the rest of the disk storage system 100.

The disk assembly 106 includes a plurality of two sided disks 108. Each side of each disk 108 is provided with a planar disk data storage media surface 110 and each disk 108 is separated by a disk spacing distance.

The disks 108 are centrally mounted on a spindle 112 that has a central axis 114 projecting from the base 104. The disks 108 extend radially outward from axis 114 to a circular perimeter 116. The disks 108 are rotatably driven by a centrally located rotary motor 118 enclosed in a rotor body 124. The rotor body 124 is of cylindrical symmetry disposed to rotate freely about the spindle 112. Inner perimeters 120 of the disks 108 are mounted and axially spaced apart between successive pairs of adjacent annular spacing rings 122. The rings 122 are circumferentially aligned and supported by an outer circumference of the rotor body 124. The disks 108 and rings 122 are secured to the rotor body 124 with an axial compression force between a lower annular compression rim 127 provided by fasteners 126 holding an upper annular compression cap 128 against the upper surface 110 of the uppermost disk 108.

A plurality of transducer heads 130 are disposed in spaced apart relationship to the respective disk surfaces 110, one head 130 to each disk surface 110 of each disk 108. Each head 130 is mounted on a respective flexure 132 connected to the actuator assembly 140 to fly above the surface of the respective disk surface 110. The relationship between heads 130, flexure 132, and the actuator assembly 140 will be described in more detail below.

Referring further now to FIG. 2, there is seen the actuator assembly 140 that carries the plurality of upper and lower actuator arms 142 (the uppermost one is shown). The assembly 140 is pivotally mounted to the base 104 at the pivot 144 and supports the plurality of arms 142 to pivot in planar relationship to the disks 108, with one arm for each corresponding disk surface 110. FIG. 2 shows the arm 140, able to rotate with the heads 130 moving along a path 150 and a latch pin 147 moving along a path $P_1$.

Each actuator arm 142 has a respective head arm 146 extending distally from the pivot 144. The distal ends of the head arms 146 support the respective distal heads 130 by the corresponding flexures 132 connected therebetween. Each head arm 146 is disposed to swing the corresponding head 130 in a data communicating relationship (i.e., data transfer), toward and away from the central axis 114 along the corresponding semicircular arc 150. The distal end of the arc 150 may be placed as close as desired to the outer perimeter 116 of the disks. The entire media surface from the inner perimeter 108 to the outer perimeter 116 is thus available for data transfer between the heads and data tracks (not shown) defined on the disks.

One or more coil arms 148 extend distally in opposite radial directions from the pivot 144. The coil arm or arms 148 are fitted with a voice coil 149 and associated conductor winding ends (not shown). The coil arm 148 distal end and the voice coil 149 are configured in a conventional manner to electromagnetically engage a magnetic field (not shown) of a sector magnet (not shown). This will control the angular position of the actuator arms 142 with respect to the pivot 144, and thereby position the heads 130 on the respective surfaces 110 of the disks 108.

The distal end 148 of the actuator arm is provided with the projecting cylindrical latch engagement pin 147 of diameter, Dp. The pin 147 extends therefrom a distance, Lp, for engaging with a latch head of the latch assembly 101 as described below.

As the arm 148 rotates about the actuator axis 144, the pin 147 moves along the arcuate path indicated by $P_1$. The latch assembly 101 is disposed between the arm 148 and the base 104 to engage with the pin 147 along the path $P_1$. Alternatively, the positions of the latch 101 and the pin 147 could be arranged to engage on the opposite side of the arm 148.

An unloading tab 160 is connected to each head 130. Each tab 160 extends radially outward from the respective head 130, to a respective free tab end 162. A respective ramp 167 of a corresponding longitudinal ramp bar 166 is aligned with each respective free tab end 162.

Each longitudinally extending ramp bar 166 is mounted in spaced apart relationship on the ramp assembly 102, projecting generally inward therefrom. Each ramp bar 166 is mounted on the ramp assembly 102 to extend generally parallel to a respective tangent 190 to the semicircular arc described by the corresponding head 130 as it swings on the corresponding arm 142 parallel to the respective surfaces 110.

The system 100 includes an actuator control module (ACM) 180 that provides power, sensing, and control signals (not shown) connecting to and from the actuator 140 and the latch 101. The ACM 180 drives the actuator 140 to position the heads 130 along the path 150. The ACM also positions the heads 130 in a safe storage condition (FIG. 2) with the heads spaced radially distal away from the disks 108 while the actuator 140 is positively latched with latch assembly 101 as described below.

Control, sensing and power operations of the ACM 180 may be implemented by conventional means well known to practitioners of the electromechanical arts. Conventional logic circuits, microprocessor and memory components in combination with suitable sense switches, timers and the like may be configured to perform the functions described herein.

The heads 130 are shown lifted off the disks 108 by the ramp 102, and the pin 147 securely latched by the latch assembly 101. The combination of the head lifting ramp 102 and the positive latching assembly 101 of the present invention reduces the probability of head/disk contact in the latched position.

The dimensions and locations of the actuator 140, ramp 162 and latch 101 are arranged so that the heads 130 will be lifted off the surface of the respective disks 108 before the pin 147 contacts the latch assembly 101. This prevents transmission of any lateral or twisting forces from such contact through the actuator arms to the heads 130, which may cause disk/head contact or head/track miss-registration.

Figure 3:
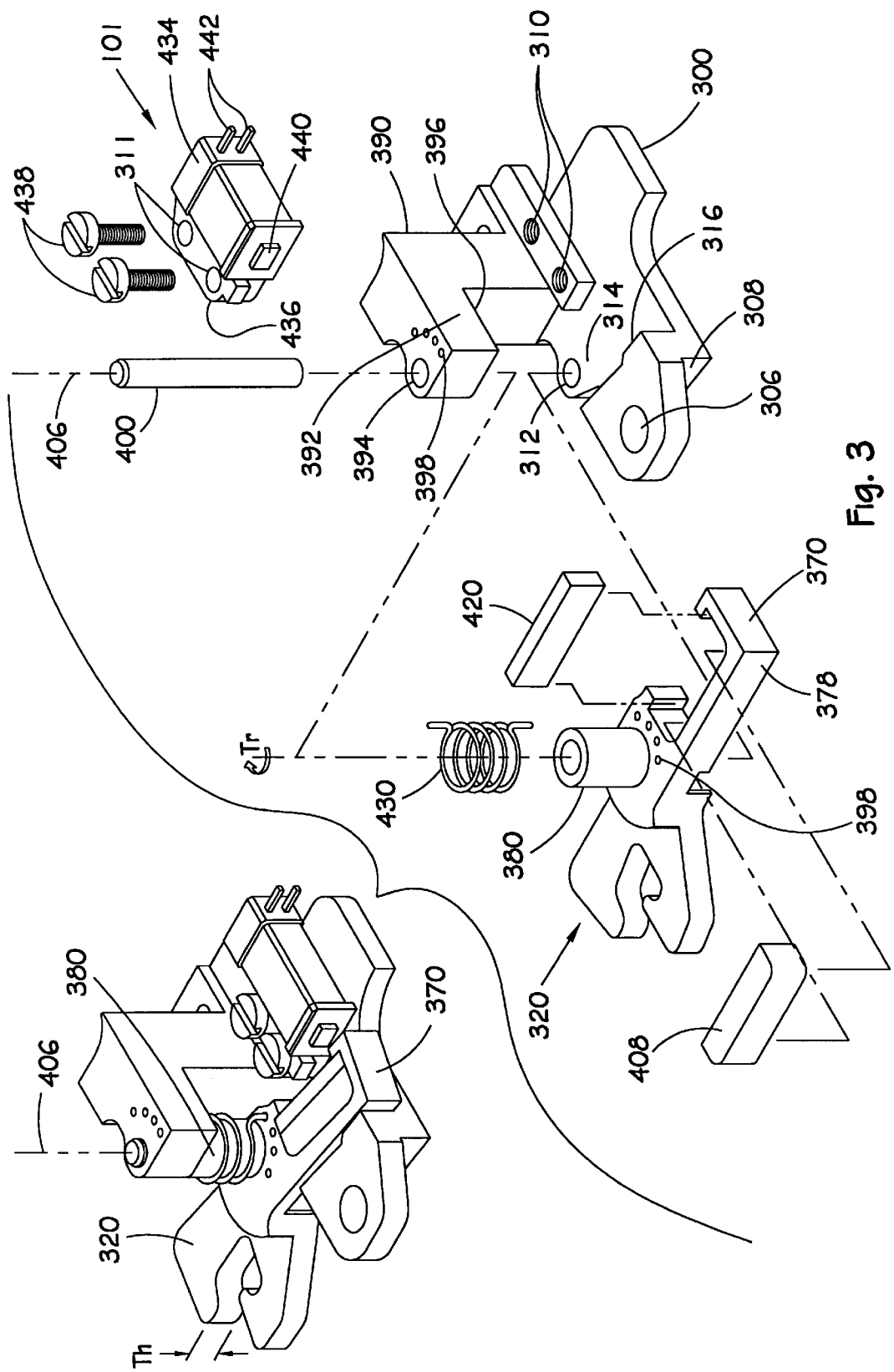
FIG. 3 is an exploded perspective view of one embodiment of the latch assembly of the present invention.
Figure 4A:
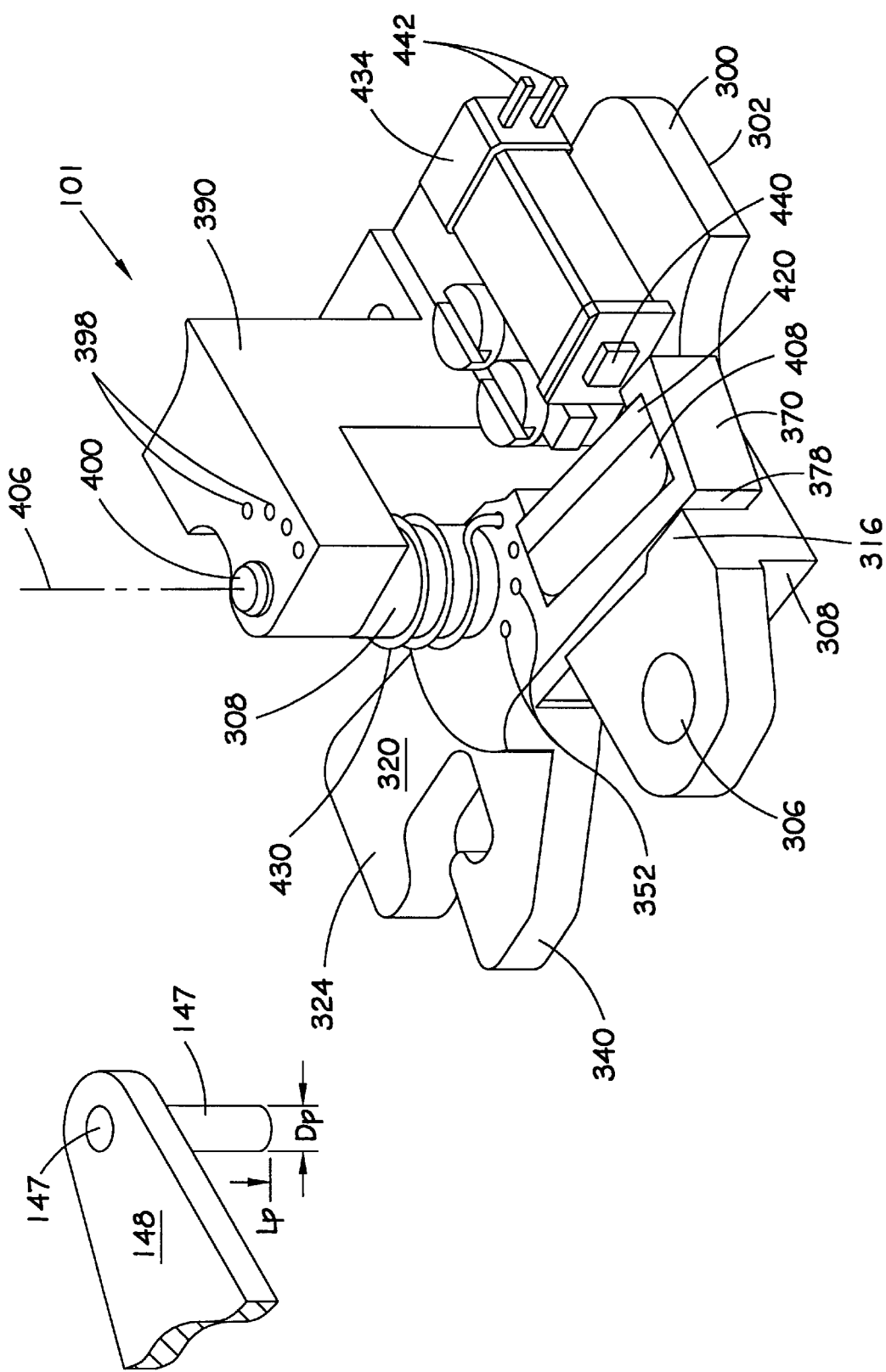
FIGS. 4a and b are detailed perspective views of the latch assembly of FIG. 3.
Figure 4B:
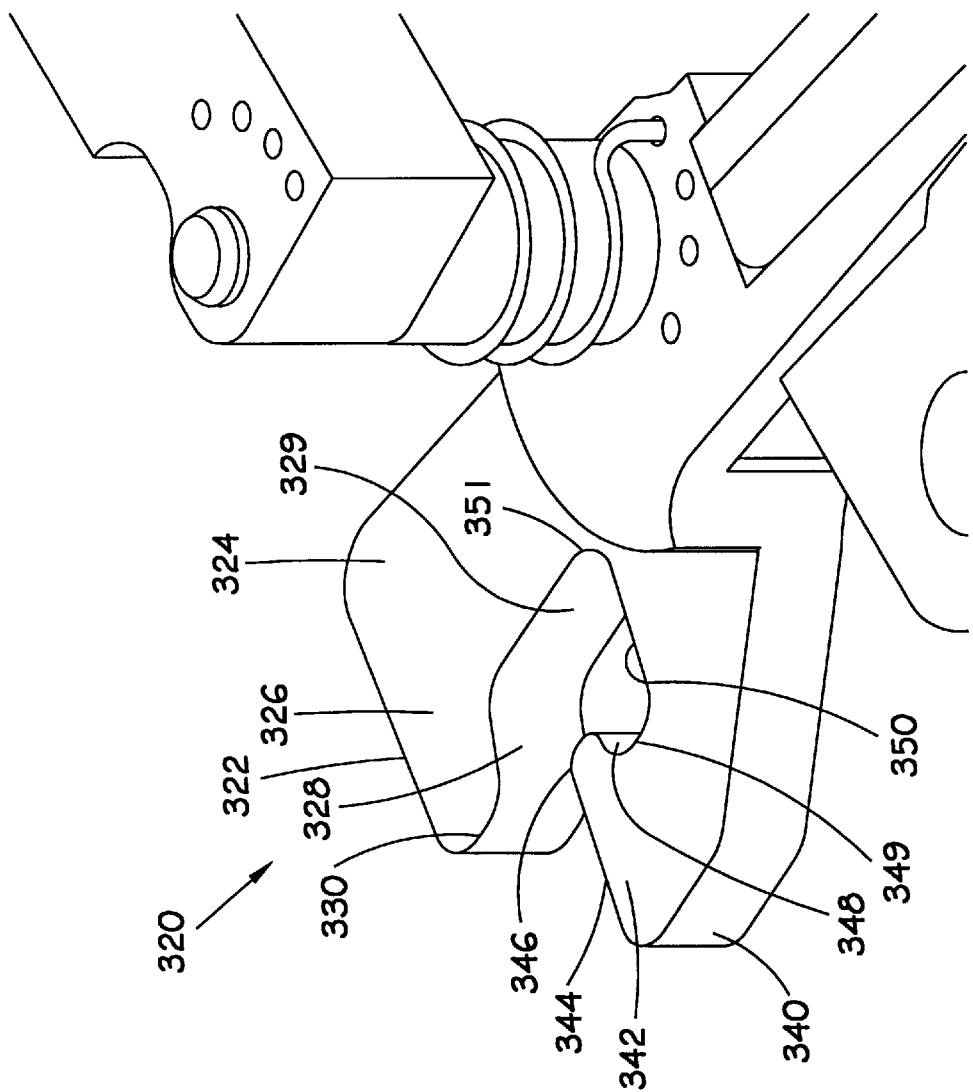

Referring now to FIGS. 3 and 4a–b. FIG. 3 therein is shown an exploded view of the latch assembly 101 of FIG. 2. FIGS. 4a–b depict, in magnified detail, a perspective view of the latch assembly 101 of FIG. 3 in relation to a cutaway portion of the distal end of the actuator arm 148 of FIG. 2.

The latch assembly 101 includes; a latch assembly base 300, a latch arm 320, a latch central hub 380, an L-shaped spindle pivot post 390, a cylindrical pivot spindle 400 having a spindle axis 406, a resilient crash stop pad 408, a ferromagnetic back plate 420, a helical pivot spring 430, and a reset solenoid 434.

Components of preferred embodiments of the assembly 101 may be fabricated by molding, machining, casting and the like. The base 300, post 390 and latch member 320 may be molded from a high strength thermoplastic, e.g., ULTEM4000 from GE Plastics Corp, or the like. The spindle 400 and the latch pin 147 are rigid members made from, for example, stainless steel. The back plate 420 is preferably magnetic, such as a ferromagnetic material from cold rolled steel and the stop pad 408 is made of a durable elastic.

The latch assembly base 300 includes base mounting holes 306 therethrough (one shown) for attaching the latch base 300 to the base plate 104 by means of mounting screws (not shown) and associated base plate 104 mounting holes (not shown).

The latch assembly base 300 has a mounting face shoulder 308 configured to fixedly align in contact with a cooperating base plate shoulder (not shown) configured on the base plate 104. The mounting face shoulder 308, mounting holes 306 in the latch assembly base 300 are configured to fixedly align the assembly 101 with respect to relative motion of the distal end of the actuator arm 148 (further described below). The base 300 also provides a proximal spindle bore hole 312 and a hole 394 in a post 390, are axially aligned 406 to rotatably receive the pivot spindle 400 (further described below).

The latch assembly base 300 provides a proximal bearing face region around the borehole 312 for rotatably supporting a proximal end face of the central hub 380.

Solenoid mounting holes 310 are defined in the latch base 300 to accept threaded proximal ends of solenoid mounting screws 438. The reset solenoid 434 also includes a solenoid flange 436 having flange mounting holes 311 defined therethrough. The mounting holes 310, flange 436 and flange holes 311 are aligned and configured for fixedly positioning a solenoid pole face 440 of the solenoid 434 with respect to the base 300.

Solenoid winding terminals 442 are connected to a solenoid current source and a current control unit (not shown) included in the system 100. The terminals 442 receive current therethrough to actuate the solenoid 434 such that an adjacent magnetic material, (specifically the iron back plate 420) will be attracted thereby.

The L-shaped spindle bracket 390 projects distally upward and away from the base 300 and forms a right angle arm 392 projecting laterally therefrom. The arm 392 defines the distal spindle bore hole 394 therethrough. The borehole 394 is laterally offset from the bracket 390 and is axially aligned 406 with the proximal borehole 312. The bores 394 and 312 are configured to fixedly receive the spindle 400.

The hub 380 defines a bore axis coaxial with 406 and rotatably receiving the spindle 400, with the distal end face the central hub 380 in rotatable contact with a distal bearing face 396 and a proximal hub face in rotatable contact with a proximal bearing face 314.

A plurality of spring tensioning apertures 398 are defined in the arm 392 and a latch arm 320. The apertures 398 are circumferentially disposed around the axis 406 distal bore 394 and bore hole in the latch arm 320 (not shown). The apertures 398 are configured to fixedly receive an end of a pivot spring 430.

The latch arm 320 has one end defining a planar latch arm head 322 of thickness, Th. The head 322 is disposed perpendicular to the pivot 406 and projects radially from the central hub 380. The other end of the latch member 320 defines a stop end or stop leg 370, oppositely projecting from the central hub 380. The hub axis 406 is aligned parallel to the actuator arm pivot axis 144. The latch member 320 is important for minimizing or eliminating the possibility of latch member 320 rotation and subsequent release of the previously latched arm 148 from unbalanced forces caused by shock or acceleration to the system 100.

The latch arm 320 and actuator arm 148 rotate about the hub axis 406 and the pivot 144 and are positioned so that head 322 will engage the latch pin 147 as described below.

A reset stop limit face 316 projects orthogonally away from the base sufficient to intercept the stop leg 370 as it rotates clock-wise (CW) about the spindle 400 away from the solenoid pole 400. The limit face 316 is spaced laterally away from the solenoid pole 440 and defines an unlatched or reset position of the latch arm 322 in a clock-wise (CW) direction (described later).

In FIG. 4b, the planar head 322 defines an upper jaw 324 spaced CW from and facing a lower jaw 340. A reset tooth 326 projects counter-clockwise (CCW) from the upper jaw 324. The upper reset tooth 326 forms a smooth reset face 328 disposed parallel to the spindle axis 406 and facing generally inward thereto. The reset face 328 runs along a line disposed inward toward the spindle axis 406 at an acute angle $\theta$-r, (as discussed later in FIG. 9) with respect to a radial Lr2, projecting from the spindle axis 406 and tangent to a reset tooth face tip 330.

The lower jaw 340 presents a hook shape latch tooth 342 projecting CW therefrom. The hook shaped latch tooth 342 is defined by two spaced apart latch tooth smooth faces 344 and 348 disposed parallel to the spindle axis 406. The two faces 344 and 348 converge CW and join tangentially to opposed ends of a latch tooth smooth end face radius 346. The end face radius 346 is disposed along a radial Lr1 (FIG. 9) and defines a line common to the latch tooth face 344.

The outer engagement face 344 is disposed radially distal from the spindle axis 406 for receiving the latch pin 147. The inner latch face 348 is disposed between the outer face 344 and the spindle axis 406, facing toward the spindle axis 406. The inner face 348 is disposed at an acute angle, $\theta$-c (FIG. 9) with respect to Lr1. The latch tooth tip 346 is disposed radially inward and CCW from the reset tooth tip 330.

Between the upper jaw 324 and lower jaw 340 there is disposed a smooth capture/pre-release (or pre-reset) face 350 also formed parallel to the spindle axis 406. The capture/pre-release face 350 is located radially inward from the reset face 328 and the engagement face 344. Pre-release surface 350 faces outward from the axis 406 and is disposed at an angle $\theta$-p (described further below).

The latch faces 328, 344, 348, 350 and tooth ends 330, 346 are shaped and finished to slidably receive the actuator pin 147 with low surface friction during engagement, capture, release and reset phases comprising a latch/unlatch cycle of the latch assembly 101 of the present invention as described below. The latch faces 328, 344, 348, 350 and tooth ends 330, 346 may be; metal, glass, ceramic, plastic, or the like, and may be; cast, molded, etched, machined, polished, or manufactured by other suitable techniques.

The latch arm 320 defines a second plurality of spaced apart spring end tensioning apertures 398 displaced radially outward from and circumferentially disposed around the hub 380. The apertures 398 are configured to fixedly receive the proximal end of the helical spring 430. The location, spacing and number of the apertures 398 in combination with the location, spacing and number of the associated distal spring end apertures 398 in arm 392 provide a plurality of angular tension positions for the spring 430. This provides for predetermining an angular restoring torque, Tr, applied by the spring 430 on the angular movement of the latch arm 320 about the hub axis 406. The spring 430 urges or biases the latch arm 320 to rotate in the direction of the restoring torque, Tr.

The magnitude of Tr, and therefore the size of the spring 430, does not have be very large, only enough to swing the latch arm 320 a few degrees from an unlatched to a latched position with the pin 147.

Referring back to FIG. 3, the latch arm stop leg 370 is configured with a C-shaped opening facing the solenoid 434. The C-shaped opening is terminated with two inward extending and oppositely facing pad mounting fingers 374. The fingers 374 are shaped to partially overlap opposed ends of the back plate 420. The resilient crash pad 408 and the back plate 420 are shaped and dimensioned to fit within the C-shape.

The crash pad 408 may be secured to the stop leg 370 by bonding the crash pad 408 to a portion of the C-shaped interior of the stop leg 370. Fixing the crash pad 408 to the leg 370 may be accomplished with a tight dimensional fit or adhesives such as contact cement (e.g., Loctite 411), or the like.

Figure 9:
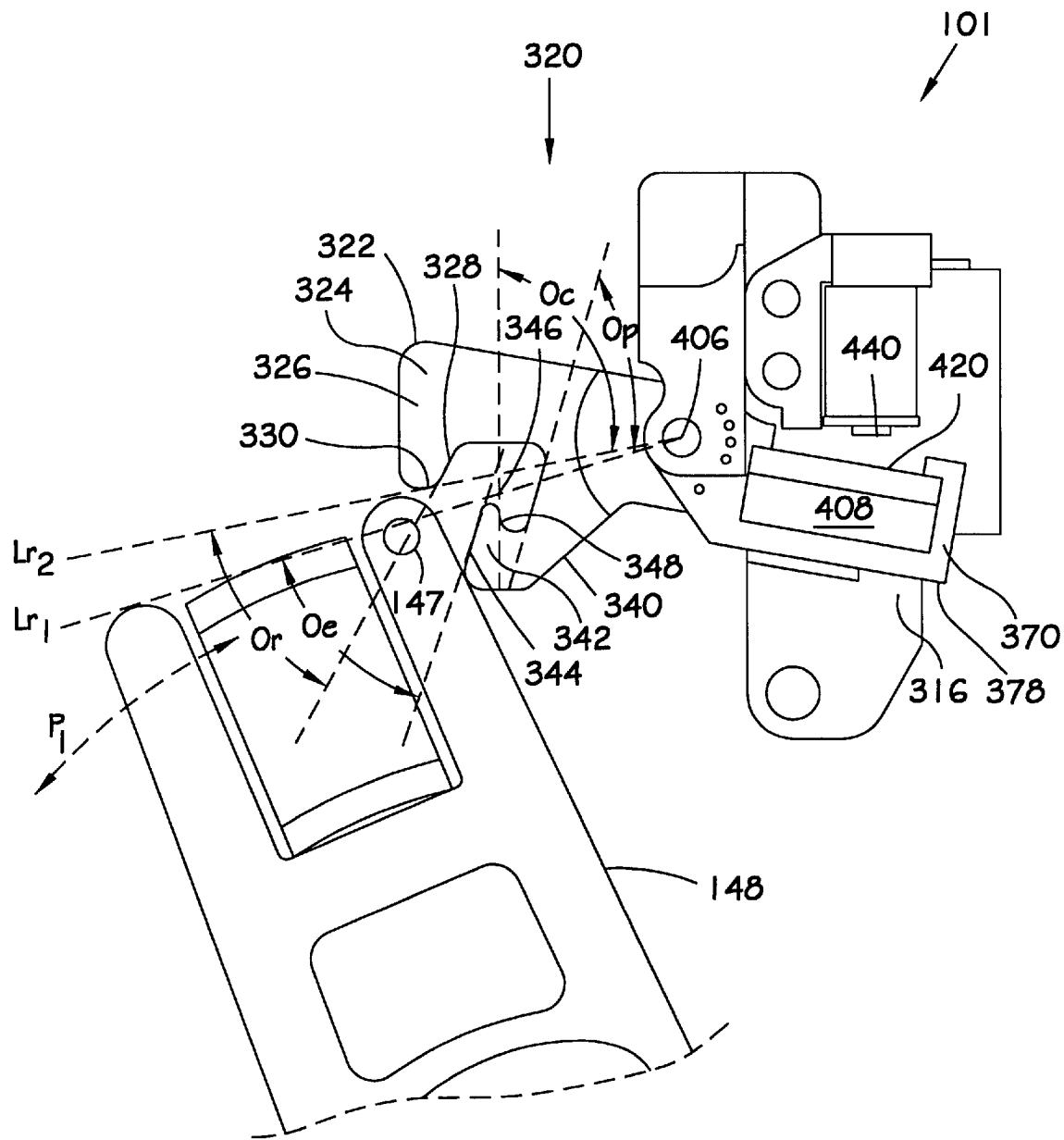
FIG. 9 is a plan view of the latch assembly of FIG. 3 in an unlatched relation to the actuator arm 142 of FIG. 2.

A portion of the stop leg 370 presents a stop limit face 378. The stop limit face 378 is spaced away from the pole face 440 with the crash pad cushion 408 and back plate 420 therebetween. The face 378 is shaped and dimensioned to contact the base limit face 316 when the arm 320 is in a reset limit position (FIG. 9).

Operation of the latch assembly 101 of the present invention through a complete latch/unlatch cycle can be understood with reference to FIGS. 5 through 12. These Figures trace a cycle of operation of the latch 101, cooperating with the arm 148, from a latched condition (C-l) through a pre-release phase (C-pr), a release phase (C-r), to a free, unlatched condition (C-u), and returning from the unlatched condition through an engagement phase (C-e1), a transition phase (C-e2), and back to the latched condition again.

Figure 5B:
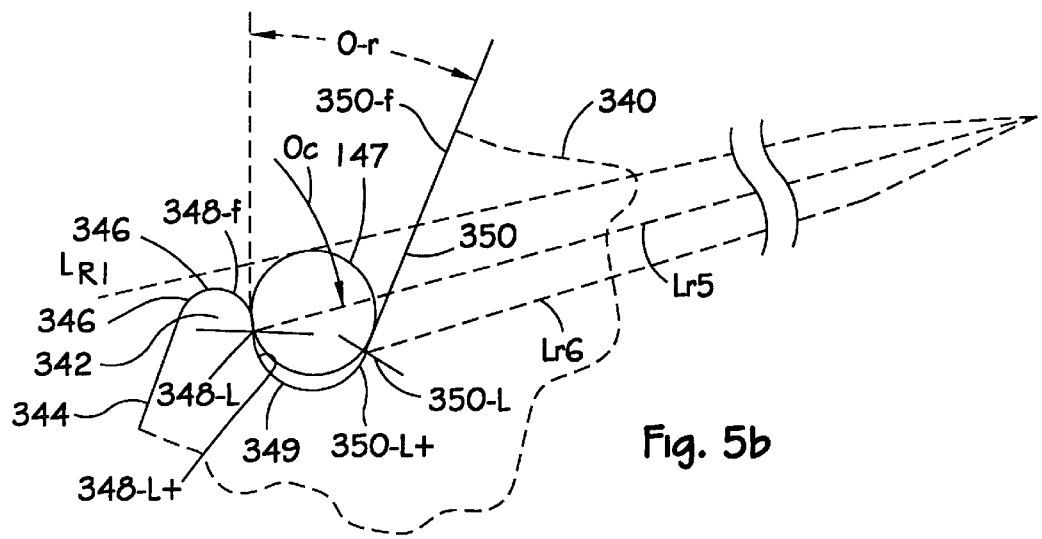
Figure 5A:
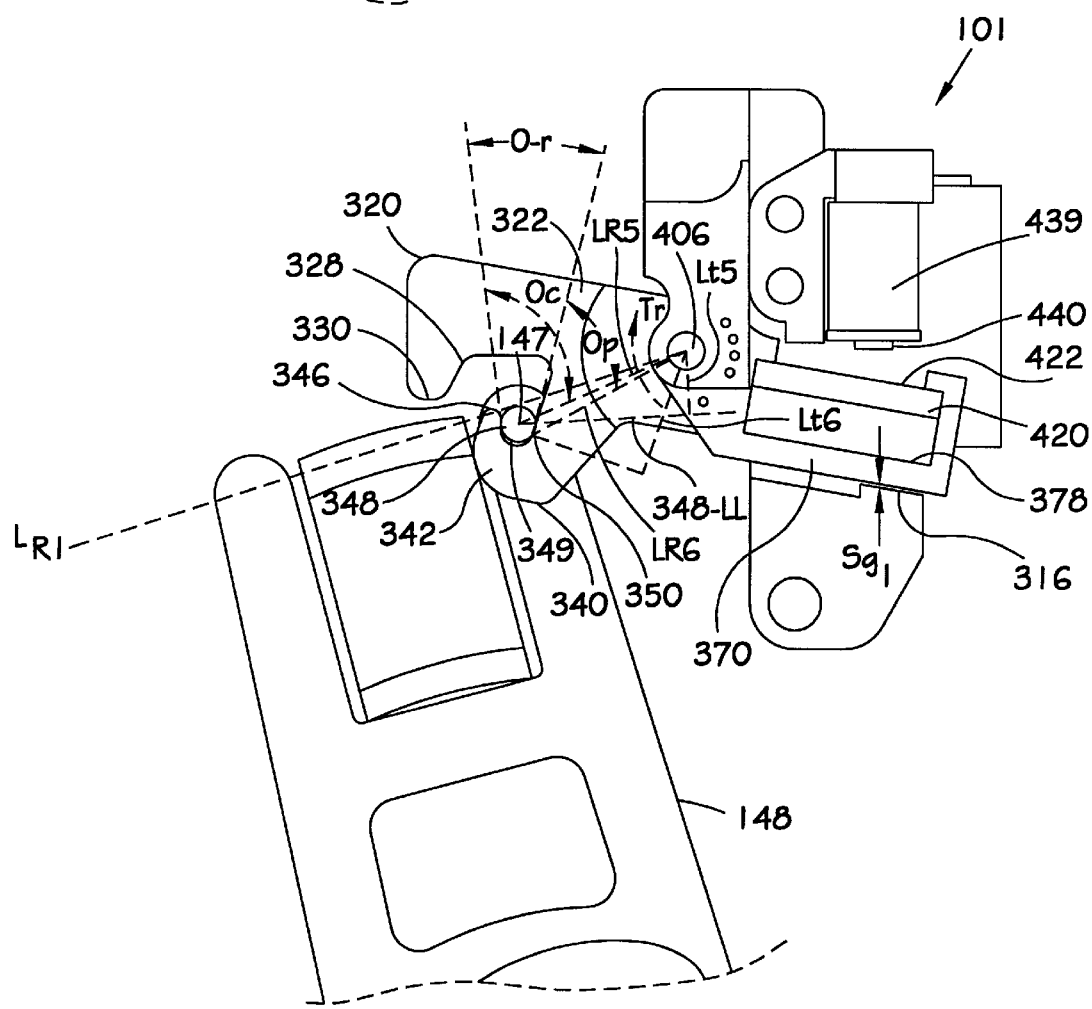
FIG. 5a illustrates a plan view of the latch pin engaged in positive latch position with the latch assembly of FIG. 3.

Referring now to FIGS. 5a and 5b and also referring back to FIG. 2, the ramp assembly 102 is disposed relative to the disks 108 such that the heads 130 are safely lifted off the disks 108 when the pin 147 and therefore the arm 148 is in a positively latched condition (C-l). The latch assembly 101 is sized and positioned with respect to the arm 148 and pin 147 so that at C-l, the lower jaw 340 secures the pin 147. The lower jaw 340 is configured so that latch tooth inner face 348 contacts the pin 147 at latch inner face contact points 348-L and 350-L.

Inner face contact point 348-L is spaced away from the pivot 406 along a radial line, Lr5, a predetermined distance, therefrom. The latch tooth inner face 348 is disposed CCW from the radial Lr5 by an acute angle, $\theta$-c.

The contact point 350-L is spaced away from pivot axis 406 along a radial Lr6 at predetermined distance therefrom. The face 350 is disposed CCW from the radial Lr6 between contact point 350-L and the pivot 406 by acute angle $\theta$-p.

Any force from the pin 147 tends to turn the latch member 320 CW, moving the pin 147 more forcefully into the latch condition between the opposing faces, 348 and 350, thus creating a static condition of positive latch for the pin 147 even in the absence of electrical power to the actuator 140. The latch spring torque, Tr, keeps the inner tooth face 348 and the capture/pre-release face 350 in contact with the pin 147 independent of CCW torque thereon from shock, acceleration or the actuator arm 148. In the present invention, the magnitude of the torque, Tr, does not have to be large. In particular, if attention is given to balancing angular moments of the latch arm 142 and latch member 320, about their respective pivots, extremely large lateral shocks or acceleration forces will not tend to move the pin 147 with respect to the faces 348, 350.

The latch head 340 does not require large size and strength in order to restrain the pin 147 and therefore can be very light weight and small in size (i.e. low inertia) and can be molded from lightweight plastic materials, e.g. ULTEM4000, or the like. This feature also allows a small torque, Tr, to move the latch head 320 quickly when free to rotate, enabling quick response to changes between unlatched and latched conditions.

The shock and acceleration tolerance of the present invention latch are essentially independent from the electrical and mechanical characteristics of the pre-reset solenoid 434 as opposed to many prior art latches in which the latch shock resistance was directly proportional to the strength of the restraining solenoid. Disk drive systems incorporating the latch 101 of the present invention thus provide additional reductions in power, size and weight over systems using prior art latches.

Another advantage of the small size, power and weight of the solenoid of the present invention is provided by the fact that the low current and low magnetic force required to hold the back iron in the pre-reset position reduces the effect of stray magnetic fields on the position of the other metallic elements of the latch and actuator assembly.

Low friction for the sliding surfaces 344, 348, 350 and 328 is preferred and may also be provided by plastic materials e.g. ULTEM4000.

A preferred shape for the latch tooth end face 346 is a semi-circle having an end face radius. The end face 346 radius, is minimized to reduce the size of the latch head 320. This radius is limited to a minimum value sufficient to provide long life (i.e. a low wear rate) for the material selected for the latch head 322. This tends to avoid generating particulate matter and tends to provide stable dimensions (i.e., stable latch position) over the life of the latch assembly 101. For example, if the latch tooth end, 346, were reduced to a sharp or angular point between face 348 and face 344 to minimize the size of the latch head 320, the point would tend to wear more rapidly and have a higher likelihood of particulate generation, both highly undesirable situations for disk drive systems.

The stop leg 370, the reset stop limit face 316, the leg limit face 378, the back plate 420 outer face, and the pole face 440 are sized and positioned relative to contact points 348-L and 350-L so that, with the pin 147 in the positive latch condition (C-l) of FIGS. 5a and 5b, neither (a) is a reset stop limit face 316 in contact with the leg limit face 378, nor (b) is the back plate 420 outer face in contact with the pole face 440.

Furthermore, in the latch condition, the leg limit face 378 is spaced away from the reset stop limit 316 a distance, sufficient to allow for manufacturing tolerance build up along with sufficient margin for shock and vibration applied to the disk drive assembly 100 and from shock arising from latching action of the lower jaw 342 against pin 147 driven by the pivot spring 430 (described in more detail below).

The faces 348 and 350 extend CCW beyond latch contact points 348-L and 350-L to respective end points 348-L+ and 350-L+. End points 348-L+ and 350-L+ are joined by a concave notch 349 therebetween. A notch 349 is sized and shaped between the end points 348-L+ and 350-L+ to be spaced away from the perimeter of pin 147 therebetween in the latch condition (C-l). A preferred shape for the notch 349 is a semicircular arc having a diameter, smaller than a diameter, Dp, of the pin 147. The notch 349 is tangent to 348 and 350 at points 348-L+ and 350-L+ extending sufficiently CCW (not shown) from the contact points 348-L, 350-L to allow for manufacturing tolerances, shock and vibration.

This ensures that the contact points 348-L, 350-L in contact with the pin 147 provide a stable, known latching location for the pin 147. By contrast, if the notch 349 were a semicircular arc of radius larger than the pin 147, there could be uncertainty in the final position of the pin 147, since it could possibly move back and forth within such a larger arc.

The faces 348 and 350 are disposed at a slight acute angle φ-r therebetween opening CW toward the upper jaw 324 as illustrated in FIGS. 5a & b. The inner face 348 is disposed at the acute angle, θ-c, with respect to the radial Lr5. If the inward urging force from the ACM is turned off at this point, the pin 147 is unable to move radially outward, constrained by the latch face 348 in the positively latched condition (C-l). By maintaining surface 348 an angle (θc) 90 degrees or less to Lr5, any torque created by the pin 147 will not impart a rotational force to the latching mechanism 101 lower jaw 342.

With regard to FIGS. 5a and 5b, the latch assembly 101, the CW restoring torque, Tr, of the latch spring 430 (see FIG. 3), Lr6, may be selected to provide a outward force acting on the pin 147 perpendicular to the contact point 350-L greater than the corresponding inward force provided by CW torque, of the ACM. Once the pin 147 is latched between the acutely angled inner latch face 348 and the capture/pre-release face 350, it will remain so by the urging of the restoring torque, Tr.

Once the ACM 180 has moved the pin 147 into the latched condition, power to the actuator 140 may be removed bringing the actuator torque, to zero. The power may be removed after a delay time, from initiation of a latching operation by the ACM 180. Power off may be determined by characterizing the particular embodiment at hand and programming or storing power off timing into the control circuitry of the ACM 180. Alternatively, sensitive position switches and associated control elements (not shown) may be provided to sense when the pin 147 is in the latch position and provide position signals (not shown) to disable power to the actuator 140.

The rigid head 320 in combination with the face angle θ-c acts to prevent lateral or angular shock and vibration causing the pin 147 to attempt to move radially outward from the latch condition. The spring torque, Tr, resists movement of the pin 147 along the face 350 inward toward the pivot 406.

In the positively latched condition (C-l), the ACM may bring the actuator arm torque, to zero, and the pin 147 will remain latched indefinitely in the C-l condition in the notch 349 with no power drain from the system 100.

If the inward force provided by the ACM 180 on the pin 147 is greater than the outward force acting on the pin 147 through the face 350, the pin 147 continues to move CW and inward, sliding along the capture/pre-release face 350. The face 350 is disposed at acute angle, θ-p with respect to a radial, Lr6, from the latch pivot axis 406 to the face contact point, 350-L. This causes the pin 147 to rotate CW, inward toward the pivot 406, until the back iron face 420 contacts the pole 440. At this point head 322 stops rotating and the pin 147 and arm 148 are fixed at rest and the power may be removed from the ACM 180 at this point.

Once the ACM power is removed, the arm 148 and pin 147 are no longer being urged to rotate CW. The torque, Tr, causes the head 322 to rotate CCW sliding the pin outward along the face 350. The pin 147 will slide outward along face 350 until captured again in the notch 349 in the positive latch condition (C-l).

Once the pin 147 is positively latched in the notch 349 by the restoring torque, Tr, and the power to the ACM is off, the pin 147 will remain latched indefinitely. In the positive latch condition (C-l) the arm 142 cannot rotate, with no power drain from the system 100.

The ACM 180 may be deactivated by electronic or mechanical means familiar to those skilled in those arts, e.g., position sensitive micro switches or proximity switches activated by the positions of the arm 142, or the head 322, or the like. Deactivation of inward movement of the pin 147 may also be based on simple timing. Once the characteristics of ACM torque, and rotational inertia of the arm 142 and latch 101 of an embodiment of the invention are known, a delay latch time required to move the arm 142 from a unrestrained position (C-u) into a positively latched position (C-l) may be characterized or calculated by one having skill in the art.

In the positive latch condition (C-l) the arm 142 cannot rotate, and the stop leg 370 is disposed between the base limit face 316 and the solenoid pole face 440.

A second concave notch 351 connects between the opposite end of the face 350 and an upper face 329 of the upper jaw 324. The notch 351 and upper face 329 provide a limit stop for the pin 147 in the event of excessive excursions of the pin 147 along the face 350.

Figure 6:
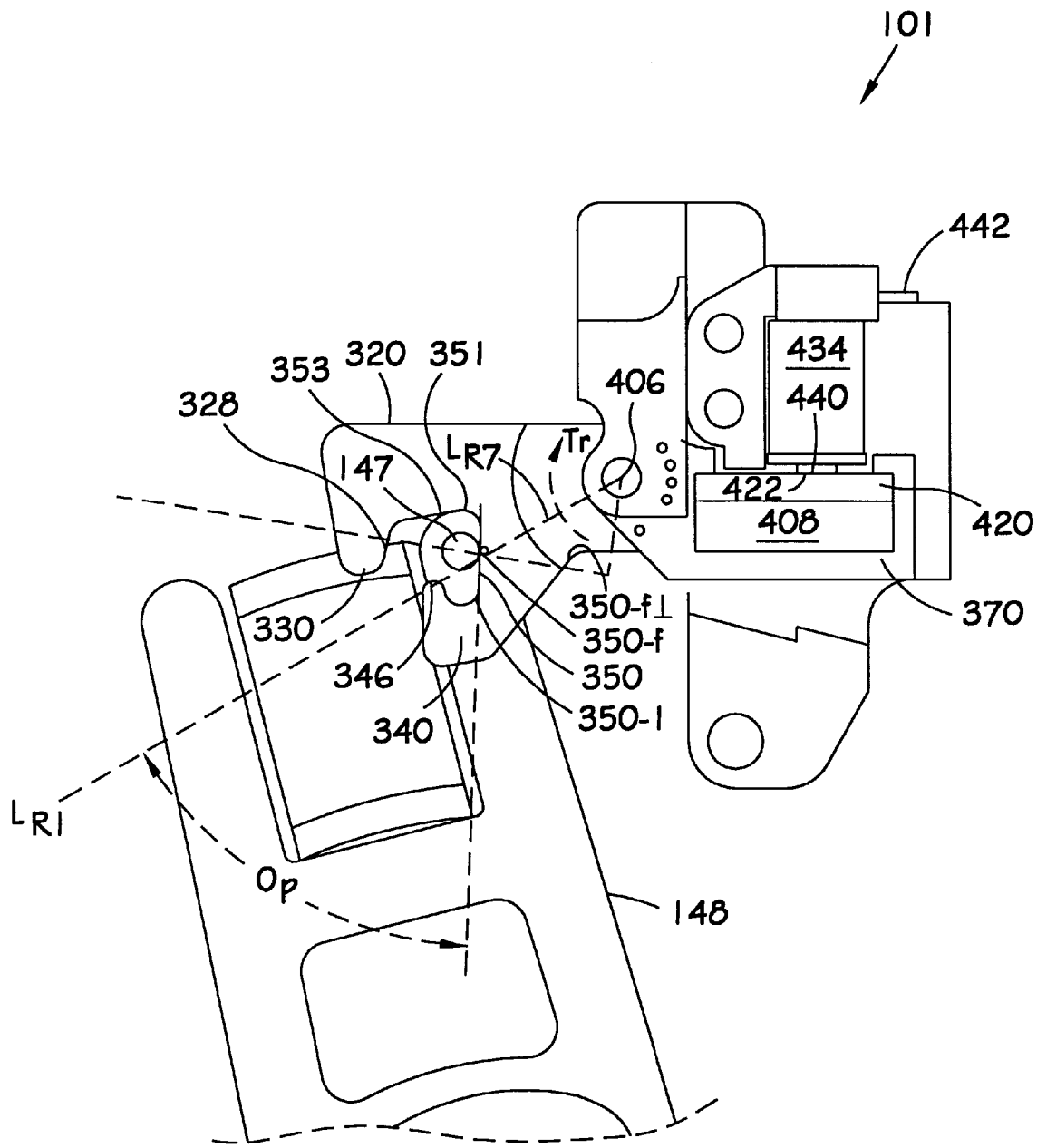
FIG. 6 is a plan view of the latch pin on a pre-release surface of a lower jaw with a back iron face in contact with a solenoid pole face of the latch assembly of FIG. 3.

Referring now to FIG. 6, the embodiment of the latching assembly of the present invention is shown at a pre-release position. The ACM 180 of the system 100 is activated to move the pin 147 inward from the latched position (C-l) of FIGS. 5a and 5b. The arm 148 is released from the positive latch condition as pin 147 slides inward on the capture/pre-release face 350 away from the latch point 350-L. The face 350 is positioned and dimensioned at an angle θ-p from the radial LR1, to allow the pin 147 to cause the latch arm 320 to rotate CCW until the back iron face 420 contacts the pole face 440 at a pre-release position (C-p).

The instance of attaining pre-release position (C-p) may be determined by sensors sensitive to the position of one or more of the latch 101 elements or actuator arm 142 elements (i.e., proximity or micro switches), or by timing a delay from start of pre-release activation until the face 420 and pole 440 make contact.

At the contact of back plate 420 with pole face 440, solenoid current is supplied to the solenoid terminals 442 (condition C-p). Reset solenoid 434 attracts the back plate 420 and holds it against the pole face 440. Since the back plate 420 and pole face 440 are already in contact, the magnetic force required to keep the back plate 420 in contact with pole face 440 is very small, only enough to counter the restoring torque, Tr, of the spring 430.

Figure 7:
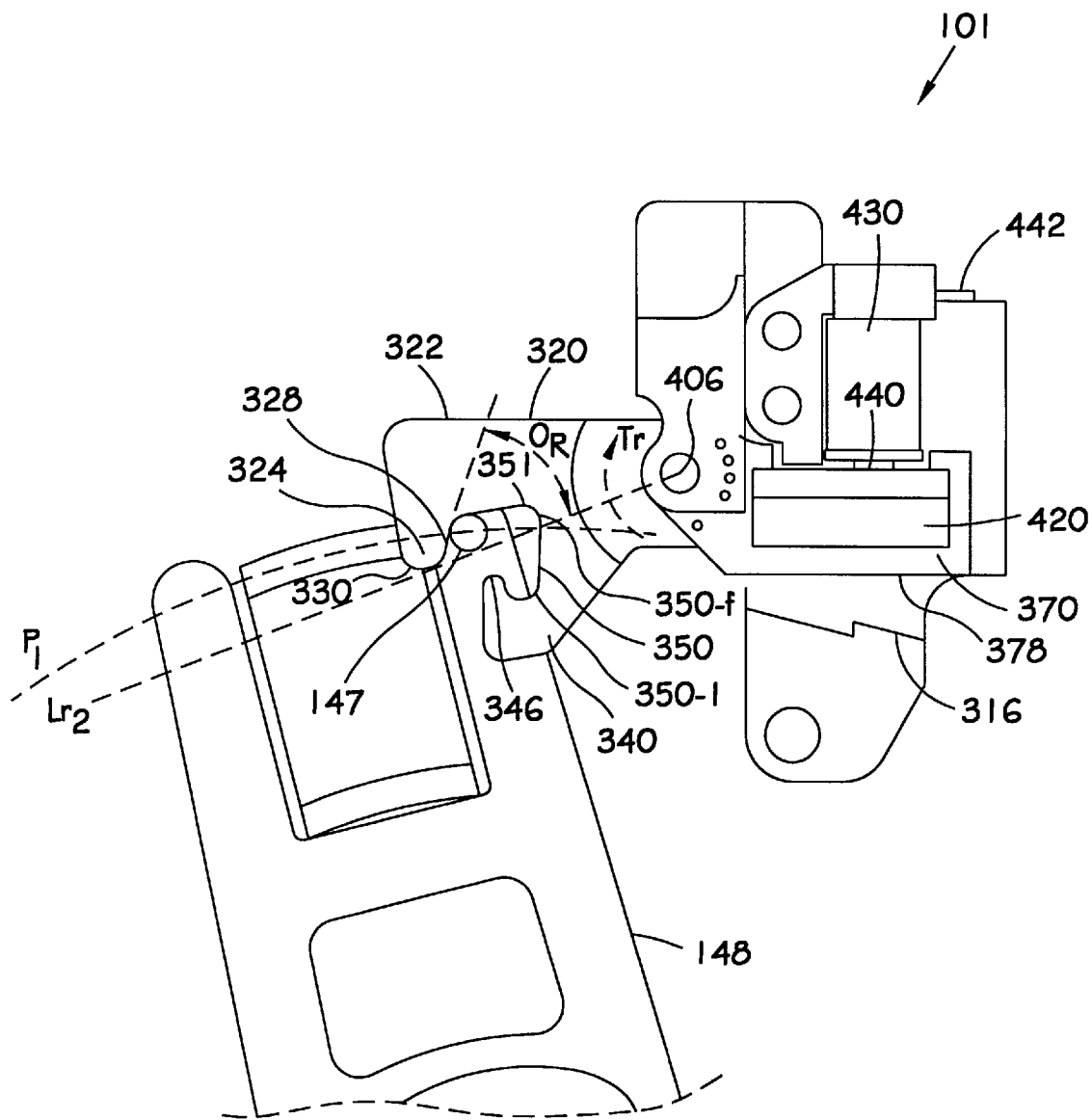
FIG. 7 depicts a plan view of the latch pin 147 engaged with the reset surface of a reset tooth of the latch assembly 101 of FIG. 3.

With reference to FIG. 7, since electric current only needs to hold the back plate 420 onto the pole face 440, the solenoid current may be much smaller than that required by previous latch systems to attract the back plate 420 from a distance toward the pole face 440. Solenoid current is maintained during the rest of the release phase until the pin 147 is unlatched from latch 320 as described above.

The ACM reverses the direction of rotation of the arm 148 and pin 147 to CCW while the current holds the back plate 420 on the pole face 440. Pin 147 thus rotates away from contact with the pre-reset face 350 toward the reset face 328. Reset face 328 is defined on the head 320 at the angle, θ-r, to slidably intercept pin 147 as it rotates CCW from contact with the pre-reset face 350 in the pre-release (C-p) condition.

If the ACM acting on the face 328 through the pin 147 provides an outward reset force greater than an inward reset force provided through the latch arm 320 constrained by the back plate 420 in contact with the solenoid 434, the back plate 420 will break free and separate from the pole 440. The pin 147 will then continue to rotate CCW, sliding outward on the reset face 328 until the head 322 rotates CW away from the pin 147 under urging of restoring torque Tr, faster than the CW movement of the pin 147 away from the reset engagement contact with face 328.

This condition can be characterized as a release condition (C-r1) determined either by timing the delay from initiation of the outward ACM force until the back plate separates from the face 440 or by providing suitable proximity switches or the like as described before.

Figure 8:
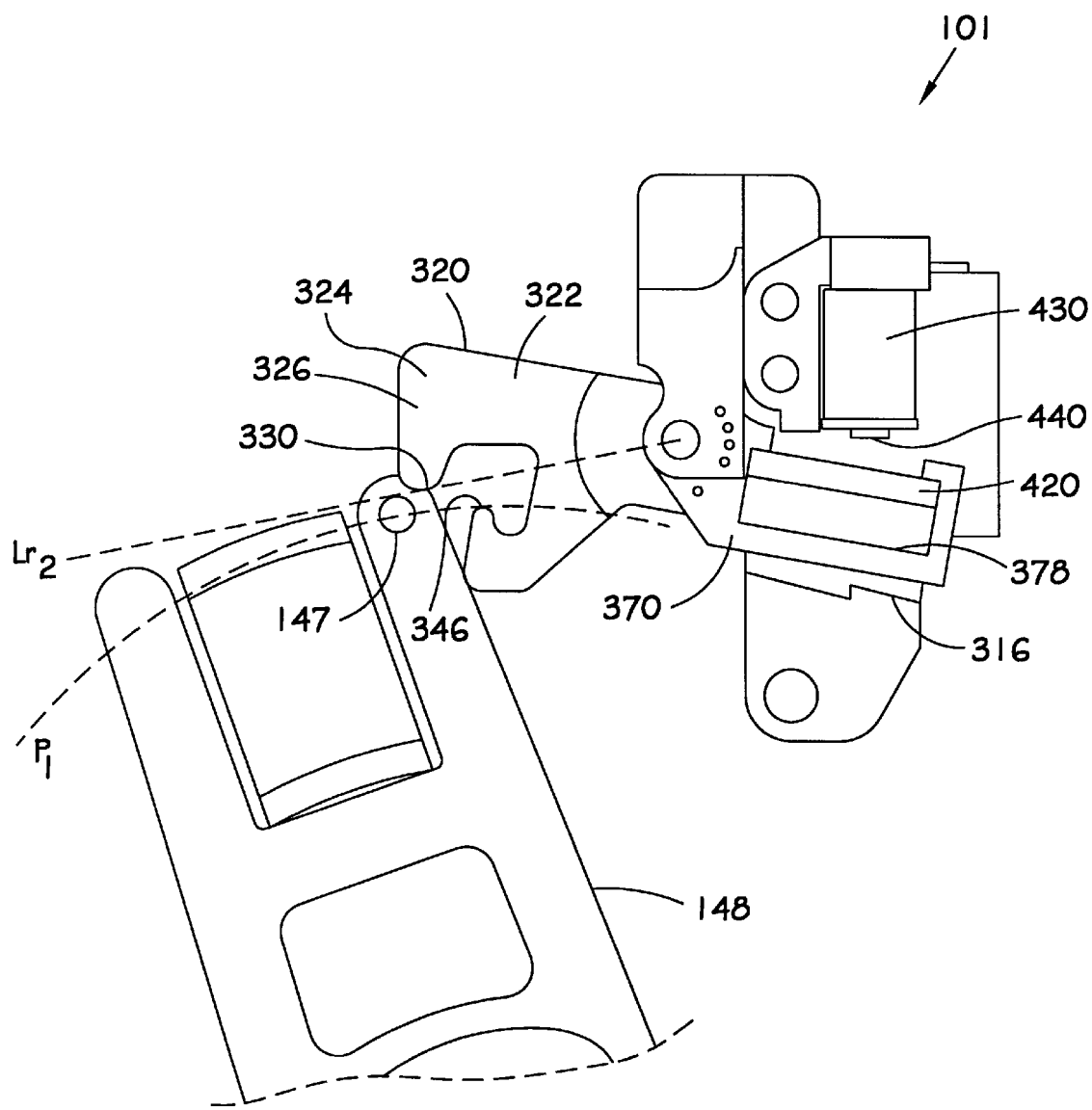
FIG. 8 is a plan view of the latch pin 147 passing the tip of the reset tooth of the latch assembly 101 of FIG. 3 during release.

Referring to FIG. 8, the latch pin 147 is distally outward beyond the tip 330 of the reset tooth 326 while the latch arm 320 rotates CW toward the unlatched position (C-u) after breaking free of, or being released from, the pre-release position. Pin 147 is then effectively free from the latch 320 and latch assembly 101. Pin 147 will continue rotating CCW under urging of the outward force provided by the ACM 180 away from the latch 101 until clear of the upper jaw 324.

The solenoid current is discontinued after the pin 147 reaches the tip 330. Again, this is determined by using micro switches, proximity switches (at position C-r1) or timing in the manner described before, or by detecting closure of an activating circuit (not shown) provided through contact of the stop leg 370 with the limit face 316.

If the outward force provided by the ACM through the pin 147 acting on the face 330 is less than the inward force provided through the latch arm 320 constrained by the solenoid 434, then the back plate 420 will remain held to the pole 440 as long as solenoid current is activated. In this case, the solenoid current may be discontinued by suitable proximity switches activated when the pin 147 is radially more distant from the spindle axis 406 than the latch tooth tip 346 or by characterizing a delay time from the activation of outward ACM force until the pin is so disposed.

The pin 147 is effectively free or unlatched, and the arm 142 may be positioned under control of the ACM system 100 electronics.

FIG. 9 depicts the distal end of the coil arm 148 in an unlatched condition (C-u) relative to the latch assembly 101. In the unlatched condition, the arm 148 is unrestrained permitting the actuator arm 142 to assume any desired position, pivoting freely about the actuator pivot 144 for data transfer between the respective heads (i.e., storing and retrieving data) and disk 108 surfaces (FIGS. 1, 2). The arm 148 can approach the latch 101 with no restraint until the latch pin 147 again contacts the outer face 344 of the lower jaw 340.

The ends of the pivot spring 430 are positioned in respective ones of spring apertures 398 so the restoring torque, Tr, provided by the spring 430 urges the latch member 320 to remain in contact with the stop leg face 378 in contact with the base limit face 316 in the unlatched condition, Cu.

In preferred embodiments of the latch of this invention, combined with the head loading ramp described above, the loading of the heads onto the disks 108 is arranged to be delayed until the pin 147 is completely free of the latch 101. This reduces prior art problems of soft, hard or catastrophic errors resulting from head-to-disk contact caused by mechanical jerk. This often occurred when prior art latches released the captured actuator arm (e.g., when the actuator arm pulled the captured end from a magnet or latch hook and the head subsequently overshot to crash into the disk surface).

With reference to FIGS. 5 and 6, when it is desired to positively latch the actuator arm 142 to the latch assembly 101, the ACM 180 of storage system 100 is activated.

The ACM 180 applies an engagement torque activated to move the heads away from data transfer relationship with the disks by moving the distal end of arm 148 and latch pin 147 toward the latch assembly 101, here a clock-wise (CW) direction. Latch assembly 101 is positioned on the base 104 (FIG. 2) so that in the unlatched condition (C-u) depicted in FIG. 9 the stop leg face 378 rests against the stop limit face 316. In the unlatched condition, the latch head 322 presents the outer surface 344 of the lower jaw 340 such that it is disposed to intercept the latch pin 147.

Figure 10:
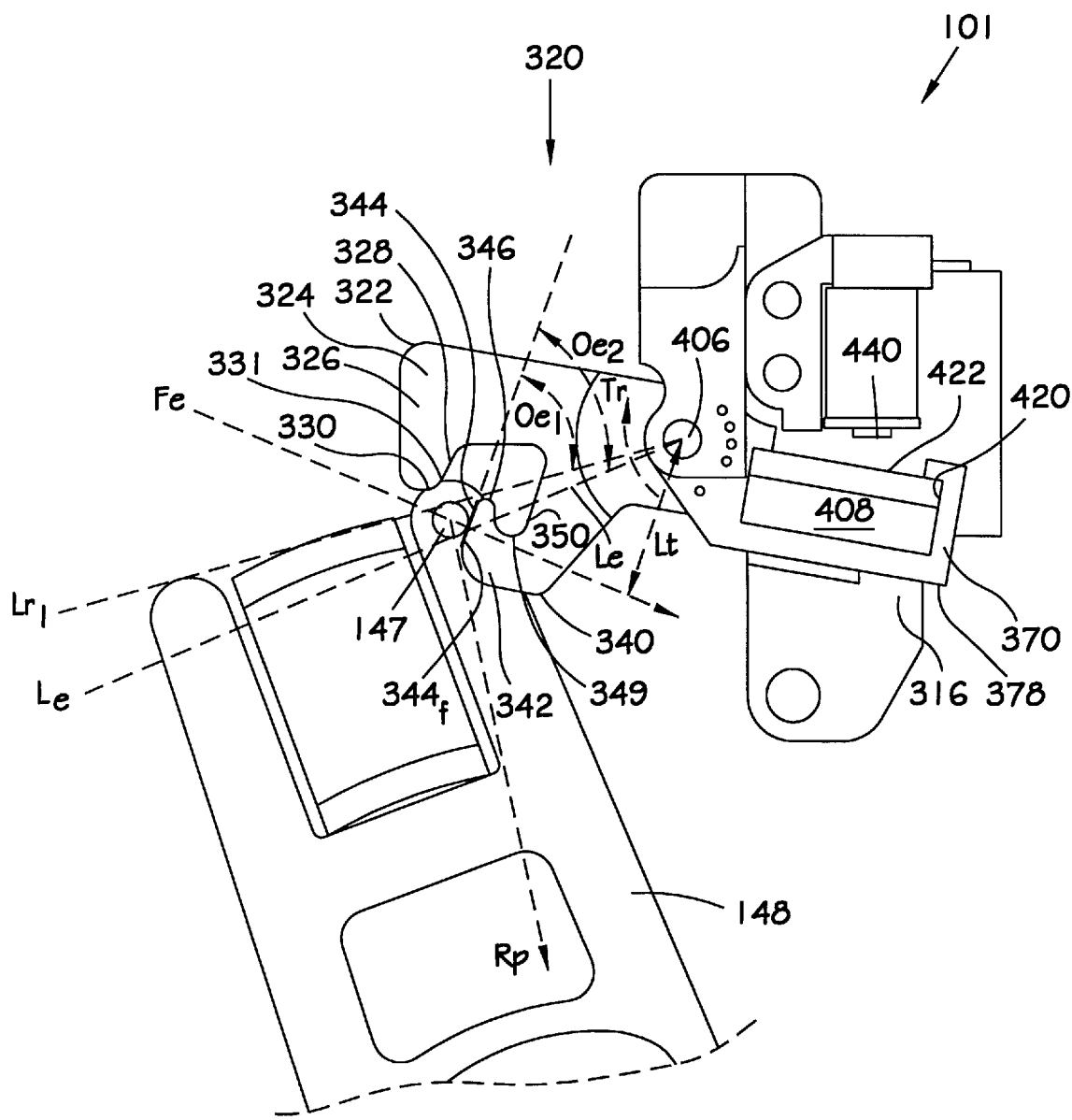
FIG. 10 is a plan view of the latch assembly 101 of FIG. 3 in a pre-engagement phase of a latch cycle with the actuator arm 142 of FIG. 2.

Referring now to FIG. 10, the latch member 320 and pin 147 are shown in a first engagement position (C-e1). In the first engagement position, the pin 147 first contacts face 344 at first contact point 344-$f$. Assuming sliding friction between the pin 147 and face 344 is essentially zero (desired for minimizing wear) the actuator arm 148 exerts a force, Fe, acting between pin 147 and face 344 perpendicular to the face 344 at the point of contact 344-$f$. First contact point 344-$f$ is spaced away from the axis 406 at a radius Le.

The length of Le and angle $\theta$-e2, between the radial Le and the face 344 at the first point of contact 344-$f$ are selected so that Fe is sufficient to overcome the torque, Tr, (and any residual sliding friction) and begin CCW rotation of the latch 320 about spindle axis 406. Fe acts through a lever arm, Lt, projecting from axis 406 parallel to the face 344 at the point 344-$f$. The minimum length of Lt is determined by Tr, angle $\theta$-e2, and Le.

Figure 11:
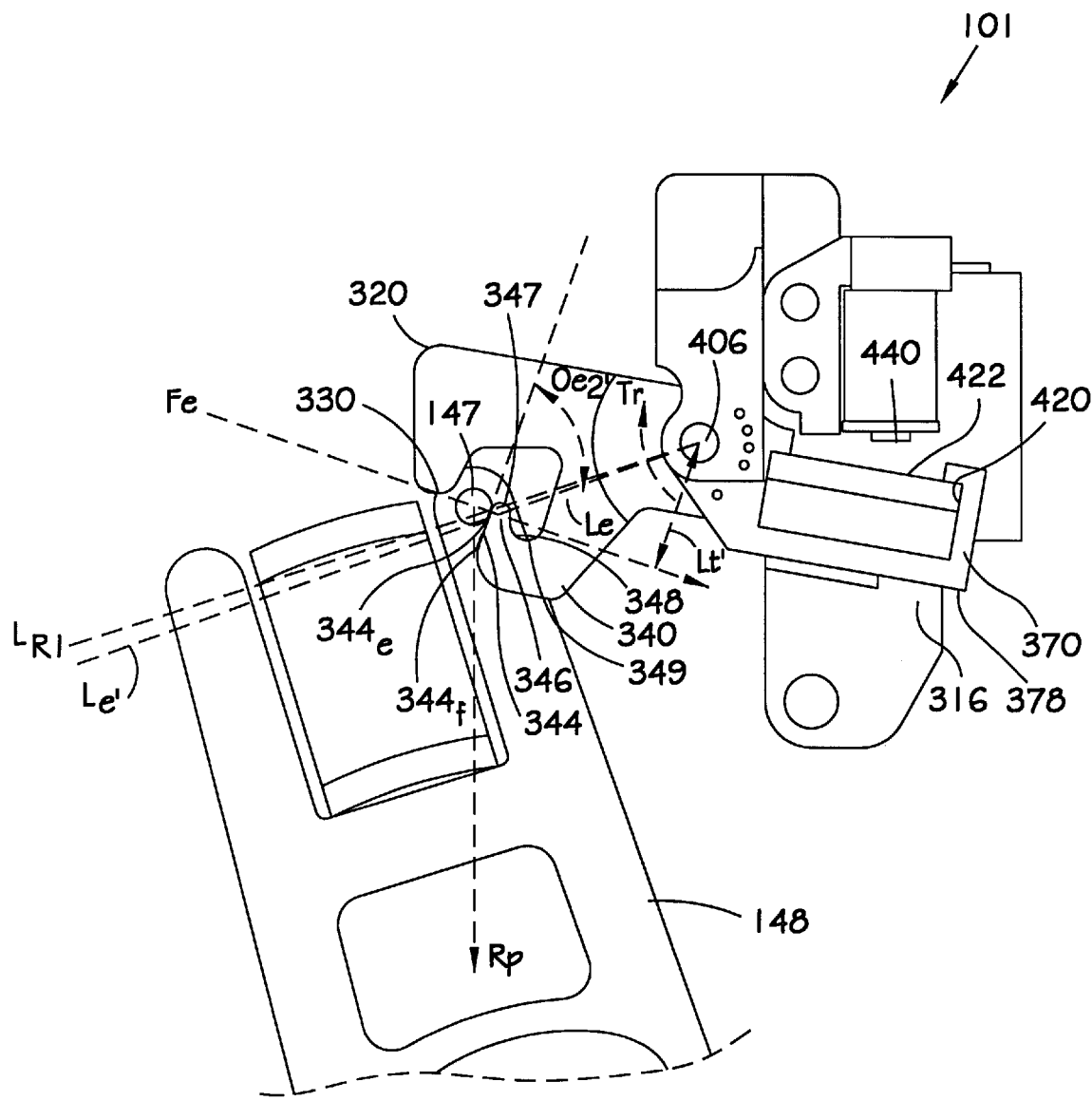
FIG. 11 depicts a plan view of a latch pin 147 traversing a latch tooth outer face of the latch assembly 101 of FIG. 3.

With regard to FIG. 11, in addition, as latch 320 rotates further CCW, the face 344 moves CCW and the pin 147 rides inward along the face 344 toward the tip 347. As $\theta$-e2 increases to $\theta$-e2', the effective length of the lever arm, Lt, decreases to a slightly smaller value Lt' at a last point of contact with the face 344, as does the radial, Le'. Force Fe still acts through the last contact point 344-$l$, therefore Fe times Lt' decreases slightly requiring the torque from the actuator arm be slightly more than that required at the first point of contact 344-$f$.

The outer engagement face 344 and inner latch face 348 are formed tangential to a radius tip 346 therebetween.

The selection of the design parameters, i.e., $\theta$-e2, $\theta$-e2', the position of 344-$f$ and 344-$l$ relative to the pivot axis 406, and related angles and dimensions are a function of: the torque, Tr, (i.e., the spring characteristics of spring 430), and the characteristics of the actuator arm 148 and the pin 147. Such selection is within the capabilities of a person having ordinary skill in the mechanical design arts.

Beyond the first engagement position (C-e1) (i.e., first contact of pin 147 with outer face 344), further CW movement of the arm end 148 toward the latch 101 slides the pin 147 along the outer surface 344. Fe times Lt' causes rotation about the spindle 406 in a pre-latched engaging CCW direction. The stop leg 370 on the opposite side of the hub 380 and spindle 400 also rotates CCW, away from the limit face 316, toward the solenoid pole 440. The spring 430 urges the latch arm 320 in a CW direction with CW restoring torque, Tr.

The distances Rp1 and Rp2 (FIG. 2), the angles $\theta$-e1, $\theta$-e2 (FIG. 10), and the inward movement of the pin 147 on the surface 344 beyond the engagement position (C-e1) are arranged so that the ACM 180 can rotate the arm 142 in CW direction. This requires sufficient torque to overcome CW restoring spring torque, Tr, in addition to any residual friction forces such as those of the pin 147 sliding on the outer surface 344. In this manner, the CW motion of the arm 148 and pin 147 causes the latch member 320 to rotate CCW about the hub 380 and spindle 400 as previously described.

FIG. 11, thus, illustrates CW movement of the coil arm 148 and latch pin 147 toward the latch 101 under control of the system ACM. The latch pin 147 causes continued CCW rotation of the latch head 322 and stop leg 370, while the leg face 378 moves away from the limit face 316 and the back iron contact face 422 approaches the solenoid pole 440. Continued CW motion of the latch pin 147 sliding along the outer face 344 causes continued CCW rotation of the latch head until the pin 147 reaches the extreme CW tip 346 of the lower jaw 340.

Figure 12:
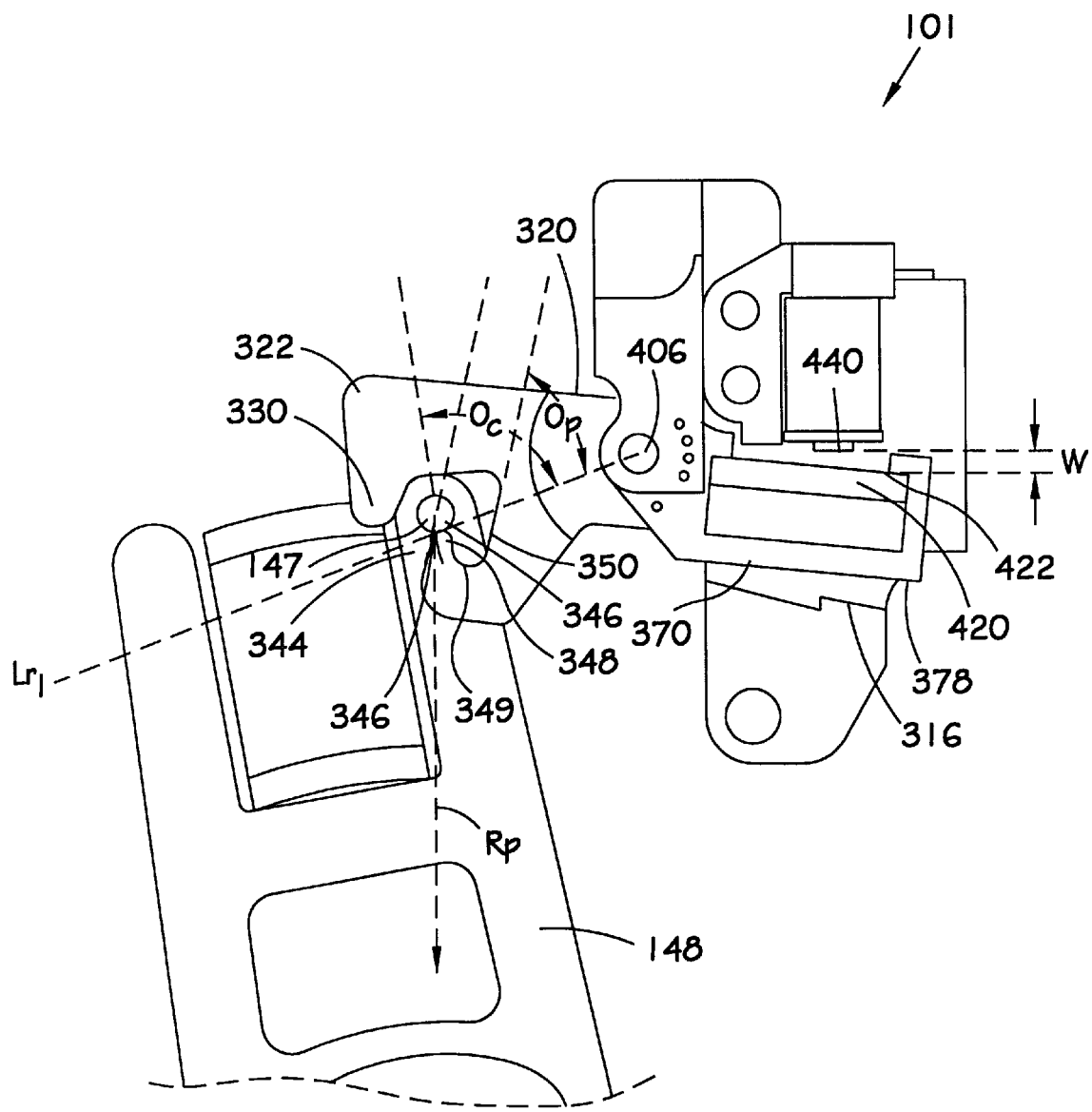
FIG. 12 shows a plan view of the latch pin 147 passing the tip of the latch tooth of the latch assembly of FIG. 3.

Referring to FIG. 12, with further CW motion of the arm 148, the pin 147 has left the outer surface 344 and is in contact only with the extreme CW tip 346 of latch tooth 342. The latch member 320 is displaced to a maximum CCW transition condition C-t) from the rest position (C-u) of FIG. 9. At the transition (C-t) condition, the pin 147 is in contact with the tip 346 of latch tooth 342 and the leg 370 is between the limit face 316 and the pole 440. The shape and dimensions of the leg 370, the pad 408, and the back plate 422 and the disposition of the limit face 316 and solenoid pole face 440 are arranged so that neither limit face 316 or pole 440 is in contact with the respective faces 378 and 420 at transition condition (C-t). In addition, spacing allowance, W (FIG. 12), between 422 and 440 may be made to account for residual magnetism in the solenoid face 440 which may tend to attract the back plate 422 and inadvertently lock back plate 422 and 440 pole face together at an inappropriate time.

With regard to FIG. 12, further CW and inward movement of pin 147 toward the spindle axis 406 slides the pin 147 inward beyond the tip 347 on the orbicular tooth end 346. The CW restoring torque, Tr, of the spring 430 keeps the latch tooth 342 in contact with the pin 147 until the pin 147 passes the intersection of end face 346 with latch face 348.

Referring to FIGS. 5a and 5b, once the pin 147 passes the intersection of end face 346 with latch face 348 the latch head 320 is unconstrained by contact with the pin 147, and Tr continues to urge the latch arm 320 to rotate CW from the maximum CCW position around the spindle axis 406. The arm 320 will continue to rotate CW until the pin 147 is captured between the latch face 348 and face 350 in the latch condition (C-l). The tooth 342 is shaped between the outer face 344 and inner face 348 such that continued inward movement of pin 147 under control of the ACM of system 100 beyond the (C-t) position of FIG. 12 allows further CW rotation of latch arm 320 from the restoring torque, Tr.

Figure 13:
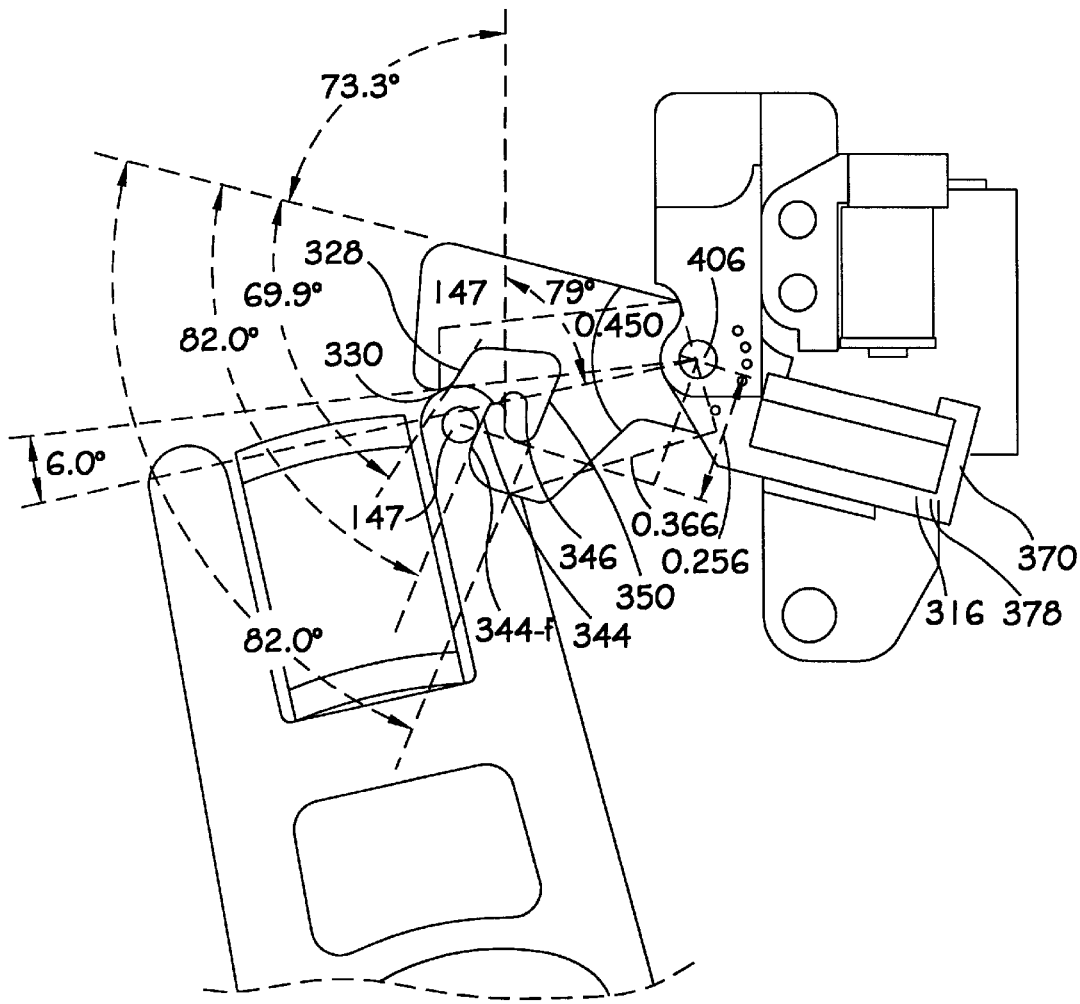
FIG. 13 is plan view of one preferred embodiment of the latch head of the present invention.

FIG. 13 displays a plan view of one preferred embodiment of a positive latch assembly 101 in accordance with the present invention.

While the foregoing detailed description has described embodiments of a data storage system incorporating a positive latch assembly in accordance with this invention, it is to be understood that the above description is illustrative only and not limiting of the disclosed invention. It will be appreciated that the present invention could be used in other systems that employ light and/or magnetic disk technology for the information transfer and storage components. In addition, it would be possible to modify the size, shape and appearance and methods of manufacture of various elements of the invention or to include or exclude various elements within the scope and spirit of this invention. Thus the invention is to be limited only by the claims as set forth below.

What is claimed is:

1. A data storage and retrieval system (100) having a base (104) and an actuator pivot (144) mounted thereon, a longitudinal actuator arm (142) having a head end (146) and an opposed latching end (148), the actuator arm disposed on the actuator pivot (144) between the head end (146) and the opposed latching end (148) counter rotatable in a first rotary direction and a counter rotary direction about the actuator pivot (144), a data retrieving head (130) mounted on the head end (146), the data storage and retrieval system including an actuator arm positive latching assembly (101), comprising:

a latch base (300) fixedly spaced apart from the actuator pivot (144);

a rigid latch post (147) projecting from the actuator arm latching end (148);

a latch pivot (400) disposed on the latch base (300);

a latch member (320) having a latch head (322) and an opposed latch stop leg (370) rotatably mounted on the latch pivot (400) disposed therebetween;

the latch member (320) counter rotatable in a second rotary direction and a second counter rotary direction about the latch pivot (400);

the stop leg (370) including a ferro-magnetic member (420);

an elastic biasing member (430) connected between the latch member (320) and the latch base (300);

the biasing member (430) biasing the latch member (320) to rotate in the second rotary direction about the latch pivot (400);

a first stop member (316) fixed to the latch base (300), the first stop member (316) shaped and positioned to stop the biasing member (430) from rotating the latch stop leg (370) in the second rotary direction about the latch pivot (400) at a latch member (320) rotary rest position;

a second stop member (440) fixed to the latch base (300), the second stop member (440) shaped and positioned to stop the latch stop leg (370) from rotating in the second counter rotary direction at a latch member (320) maximum counter rotary position, the maximum counter rotary position rotationally displaced from the rotary rest position in the second opposed rotary direction;

the latch head (322) bifurcated to define a reset jaw (324) and a facing capture jaw (340), the reset jaw (324) and capture jaw (340) opening outward from the latch pivot (400);

a first engagement face (344), a capture face (348) and a capture tooth end face (346) defined on the capture jaw (340), disposed distally from the latch pivot (400), each configured to slidably receive the latch post (147) when the latch post (147) is in respective contact thereon;

the first engagement face (344) having a first contact point (344-*f*) and a spaced apart last point of contact (344-L);

the last point of contact (344-L) disposed radially proximal to the latch pivot (400) with respect to the first contact point (344-*f*);

the first engagement face (344) configured on the latch head (322) such that, with the latch member (320) in the rotary rest position, and the latch post (147) moved in the first rotary direction by the latching end (148) from an unlatched position radially distal from the latch pivot (400) with respect to the first engagement face (344), the latch post (147) makes contact with the engagement face (344) at first contact point (344-*f*);

the first engagement face (344) further configured so that on further movement in the first rotary direction of the latch post (147) by the latching end (148) from the first contact point (344-*f*), the engagement face (344), biased by the biasing member (430) to remain in slidable contact with the latch post (147), causes the latch member (320) to rotate in the second counter rotary direction until the latch post (147) reaches the last point of contact (344-L) on the engagement face (344);

the capture face (348) defined on the capture jaw (340) having a first capture end (348-*f*) and a spaced apart capture point (348-L), disposed distally from the latch pivot (400), the capture face (348) radially proximal to the latch pivot (400) with respect to the engagement face (344);

the engagement face (350) defined on the capture jaw (340), including a second capture point (350-L) and a spaced apart second engagement face end point (350-*f*), the second engagement face (350) disposed radially proximal to the latch pivot (400) with respect to the capture face (348);

the tooth end face (346) further configured so that, with the latch post (147) in contact, the latch head (322) is rotationally displaced in the second counter rotary direction to a first local rotary maximum position from the latch member (320) rotary rest position;

the second stop member (440) disposed on the latch assembly (101) so that the stop leg is spaced away from the second stop member (440) when the latch post (147) is on the first local extremum and the latch member (320) is at the first local rotary maximum position;

the tooth end face (346) further configured so that, when the actuator arm moves the latch post (147) in the first rotary direction from the local extremum, with the biasing member (430) keeping the latch head (322) in slidable contact with the latch post, the latch head (322) is rotated in the second rotary direction away from first local rotary maximum position until the latch post (147) reaches the first capture end (348-*f*);

the capture face (348) further configured on the latch head (322), with the latch post (147) radially proximal to the pivot (400) with respect to the first capture end (348-L);

the second engagement face defined on the latch head (322) with the capture point (350-L) spaced apart from the capture point (348-*l*) and radially disposed between the radially distal capture point (348-L) and the radially proximal second engagement end (350-*f*) with respect to the pivot (400), such that, with the latch post (147) shaped, sized and disposed between the reset jaw (324) and capture jaw (340) and between the capture face (348) and the second engagement face (350), the latch head (322) is rotated by the biasing member (430) in the rotary direction until the latch post (147) is captured between the capture point (348-L) and the capture point 350-L);

the second engagement face further defined with the latch post (147) contacting the end point (350-L), a perpendicular (350-L) to the face (350) at the end point (350-L) is disposed in the second rotary direction rotary direction from a radial (Lr6) directed from the point of contact (350-L) to the pivot (400);

the second engagement face further defined with the latch post (147) contacting the end point (350-*f*), a perpendicular to the face (350 at the end point (350-*f*) is disposed in the second rotary direction rotary direction from a radial (Lr7) directed from the point of contact (350-*f*) to the pivot (400);

the second stop member (440) disposed on the base (300), in combination with the second engagement face end (350-*f*) disposed with respect to the stop leg (370), such that, with the latch post (147) in contact with the second engagement face end (350-*f*, the stop leg (370) contacts the second stop member (440) in a maximum rotary position in the second counter rotary direction;

a holding magnet (434) adjacent to the second stop member (440) capable of attracting the ferromagnetic member (420) to hold the stop leg (370) in contact with the second stop member (440) so the latch head (322) remains in the maximum rotary position in the second counter rotary direction when the latch post (147) is not in contact with the latch head (322);

a reset face (328) configured on the reset jaw (324), the reset face (328) defining a reset contact point (328-L) and a counter rotary reset local extremum (330);

the reset contact point (328-L), and counter rotary reset local extremum (330) disposed sufficiently radially distal from the pivot (400) with respect to the capture tooth end face (346) when the latch post (147) contacts the reset contact point (328-L) such that, a) with the biasing member (430) biasing the latch head (322) in the second rotary direction and,
b) the stop leg (370) having been in contact with the second stop member (440) and,
c) upon release of the stop leg (370) from being held in contact with the second stop member (440),
d) the latch head (322) rotates in the second rotary direction toward the rotary rest position with the latch post (147) remaining in an unlatched position radially distal from the capture tooth (346) and the latch pivot (400), whereby the latch post (147) will be unlatched from the latching assembly (101).

* * * * *